(12) United States Patent
Parundekar et al.

(10) Patent No.: US 10,395,530 B2
(45) Date of Patent: *Aug. 27, 2019

(54) SITUATIONAL UNDERSTANDING OF UNKNOWN ROADWAY CONDITIONS THAT ARE AHEAD FOR A CONNECTED VEHICLE

(71) Applicant: TOYOTA JIDOSHA KABUSHIKI KAISHA, Toyota-shi, Aichi-ken (JP)

(72) Inventors: Rahul Parundekar, Mountain View, CA (US); Kentaro Oguchi, Mountain View, CA (US); Veera Ganesh Yalla, Mountain View, CA (US); Preeti Jayagopi Pillai, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,117

(22) Filed: Jul. 5, 2018

(65) Prior Publication Data

US 2018/0322780 A1  Nov. 8, 2018

Related U.S. Application Data

(63) Continuation of application No. 15/196,593, filed on Jun. 29, 2016, now Pat. No. 10,049,571.

(51) Int. Cl.
*G08G 1/0967* (2006.01)
*H04L 29/08* (2006.01)
(Continued)

(52) U.S. Cl.
CPC ......... *G08G 1/0967* (2013.01); *G08G 1/0112* (2013.01); *G08G 1/0133* (2013.01);
(Continued)

(58) Field of Classification Search
CPC .............................. G08G 1/0967; H04L 67/12
(Continued)

(56) References Cited

U.S. PATENT DOCUMENTS

| 6,721,650 B2 * | 4/2004 | Fushiki ............... G08G 1/0104 701/118 |
| 2004/0073367 A1 * | 4/2004 | Altan .................... B60W 30/16 701/301 |

(Continued)

FOREIGN PATENT DOCUMENTS

JP     2002-251698     9/2002

*Primary Examiner* — Steven Lim
*Assistant Examiner* — Mancil Littlejohn, Jr.
(74) *Attorney, Agent, or Firm* — Burbage Law, P.C.; Jon-Michael Burbage; Elizabeth Ruzich

(57) ABSTRACT

The disclosure includes implementations for executing one or more computations for a vehicle. Some implementations of a method for a vehicle may include identifying one or more computations as being un-executable by any processor-based computing device of the vehicle. The method may include generating a query including query data describing the one or more computations to be executed for the vehicle. The method may include providing the query to a network. The method may include receiving a response from the network. The response may include solution data describing a result of executing the one or more computations. The response may be provided to the network by a processor-based computing device included in a hierarchy of processor-based computing devices that have greater computational ability than any processor-based computing devices of the vehicle.

20 Claims, 12 Drawing Sheets

(51) Int. Cl.
  *G08G 1/01* (2006.01)
  *H04W 4/44* (2018.01)
  *H04W 4/029* (2018.01)

(52) U.S. Cl.
  CPC ..... *G08G 1/0141* (2013.01); *G08G 1/096716* (2013.01); *G08G 1/096741* (2013.01); *G08G 1/096775* (2013.01); *G08G 1/096783* (2013.01); *H04L 67/12* (2013.01); *H04W 4/029* (2018.02); *H04W 4/44* (2018.02)

(58) Field of Classification Search
  USPC ................ 340/901, 902, 903, 904, 905, 906
  See application file for complete search history.

(56) References Cited

U.S. PATENT DOCUMENTS

| | | | |
|---|---|---|---|
| 2005/0030184 A1* | 2/2005 | Victor | B60K 28/06 340/576 |
| 2008/0027636 A1* | 1/2008 | Tengler | G01C 21/3484 701/425 |
| 2008/0272898 A1* | 11/2008 | Irion | B60Q 9/008 340/436 |
| 2016/0071418 A1* | 3/2016 | Oshida | G08G 1/22 701/23 |

* cited by examiner

Figure 5 (Not to scale)

SITUATIONAL UNDERSTANDING OF UNKNOWN ROADWAY CONDITIONS THAT ARE AHEAD FOR A CONNECTED VEHICLE

CROSS-REFERENCE TO RELATED APPLICATIONS

This patent application is a continuation of U.S. patent application Ser. No. 15/196,593, entitled "Situational Understanding of Unknown Roadway Conditions that are Ahead for a Connected Vehicle" and filed on Jun. 29, 2016, the entirety of which is hereby incorporated by reference.

BACKGROUND

The specification relates to providing situational understanding of unknown roadway conditions that are ahead for a connected vehicle.

A vehicle traveling down a roadway is not capable of observing all the roadway conditions that are ahead of them on the roadway. For example, a roadway condition may include one or more of the following events: a traffic jam; a traffic accident; an available car pool lane; roadway construction; etc.

The driver may not be able to view all these events. For example, the events may be located many miles away or behind a curve in the roadway, a hill or some other obstruction which occludes the event from the driver's vision. The sensors of the vehicle may not be able to detect these events either. For example, the event may be outside of the range of the sensors of the vehicle, and so, the vehicle may not be able to inform the driver of these events. Accordingly, drivers are unaware of some of the roadway conditions that are ahead of them for these example reasons. Such roadway conditions may be described as "unknown roadway conditions" because neither the driver nor the driver's vehicle are aware of their existence.

SUMMARY

Described are implementations that include a system, method and computer program product for providing situational understanding of one or more unknown roadway conditions that are ahead of a connected vehicle.

In some implementations, a roadway system may include a lead vehicle and a main vehicle. The lead vehicle and the main vehicle may both be "connected vehicles" because they have the ability to wirelessly send and receive messages via a network. The lead vehicle is traveling ahead of the main vehicle. The lead vehicle may include a sensor set that detects an event that is ahead of the main vehicle. The driver of the main vehicle may be unaware of the event because it occurs too far ahead (e.g., fractions of a mile, one mile, ten miles or less, dozens of miles, hundreds of miles, etc.) of them or is otherwise obstructed from their observation. For example, the event may be obscured by one or more of the following: a curve in the roadway; a larger vehicle on the roadway (e.g., a semi-truck); a hill or some other natural obstruction; a building or some other man-made obstruction, etc.

In some implementations, the lead vehicle may transmit environment data to a computing device via the network. The computing device may include, for example, a server, a roadside unit or some other processor-based computing device. The environment data may describe the event itself and a geographic location associated with the event (e.g., the geographic location of the lead vehicle or the geographic location of the event as determined by a combination of the geographic location of the lead vehicle and a range finder such as LIDAR that indicates the distance from the lead vehicle to the event).

In some implementations, the computing device or the lead vehicle may classify the event based on an ontology or some other classification system. For example, the environment data may include images of the event and the ontology may enable image-based classification of the event so that the type of event detected by the lead vehicle may be determined. An event may include any type of event that may cause roadway congestion or otherwise be associated with roadway congestion. The type of event may include, for example, one or more of the following: a traffic jam; a traffic accident; a pothole; a roadway construction zone; a carpool lane; roadway debris; roadway flooding; or any other event that may cause congestion on the roadway.

In some implementations, the main vehicle may transmit driver data to the computing device via the network. The driver data may describe (1) one or more activities of a driver of the main vehicle, (2) the geographic location of the main vehicle and (3) the route of the main vehicle. The one or more activities of the driver may include, for example, one or more of the following: a gaze of the driver that is associated with the driver being distracted or prone to unawareness of one or more roadway conditions; a placement of one or more hands of the driver that indicate that the driver is distracted or prone to unawareness of one or more roadway conditions; and an interaction by the driver with a head unit or infotainment system of the main vehicle which indicates that the driver is distracted or prone to unawareness of one or more roadway conditions.

In some implementations, the computing device may determine whether the event described by the environment data is relevant to the main vehicle. For example, the event may be relevant to the main vehicle if the geographic location of the lead vehicle is present on the route of the main vehicle and the geographic location of the main vehicle indicates that the main vehicle has not passed the event so that the event is still ahead on the route of the main vehicle.

In some implementations, the computing device may determine whether the event is relevant to the driver based on the driver data. For example, the computing device may estimate whether the driver is distracted or otherwise likely to be unaware of the event or other roadway conditions based on the one or more activities described by the driver data. If the driver is estimated to be distracted or otherwise likely to be unaware of the event or other roadway conditions, then the event may be determined to be relevant to the driver.

In some implementations, the computing device may generate a wireless message including notification data. The notification data may describe the event and the geographic location of the event. The notification data may be operable to cause a notification system of the main vehicle to provide a set of warnings to the driver of the main vehicle so that they may be made aware of the event in sufficient time for them to respond to the event. In some implementations, the warning set may include a forewarning of the event at a first time followed by a warning of the event at a second time. In this way the driver may be made aware of the event in stages so that they do not forget about the event or feel that the warning was provided too abruptly.

In some implementations, the computing device may only generate the wireless message if the event is both (1) relevant to the main vehicle and (2) relevant to the driver of the main vehicle. In this way, the computing device may consider both factors external to the main vehicle (e.g., the environment data used to determine the relevancy of the event to the main vehicle) and factors internal to the main vehicle (e.g., the driver data used to determine the relevancy of the event to the driver of the main vehicle). No other approach beneficially considers both external and internal factors to achieve a situational understanding of the roadway conditions as described herein.

In some implementations, the geographical location of one or more of the lead vehicle and the main vehicle may be accurate to within plus or minus 1.5 meters of the lead vehicle and the main vehicle. This approach beneficially provides lane-level understanding of roadway conditions. For example, since a lane of a roadway is typically 3.0 meters wide or less, the geographic location of the lead vehicle and the main vehicle may be known with lane level accuracy. This approach is beneficial, for example, because an event may be relevant to a lane of travel of the lead vehicle but not relevant to the lane of travel of the main vehicle, and so, a determination may be made to not provide the warning set to the driver of the main vehicle if they are not traveling in the same lane as the lead vehicle or the same lane affected by the event.

In some implementations, historical data may indicate that the driver is aware of the event. For example, the driver may have driven past the event within some time threshold (e.g., one to two hours, one to two days, etc.) or some occurrence threshold (e.g., the driver has driven past the event two times, five times, a dozen times, etc.). One or more of the computing device and the notification system may determine that the driver should not receive the warning set based on the historical data indicate that the driver is aware of the event.

In some implementations, the notification system of the main vehicle may continue to gather driver data. The main vehicle may determine that the driver does not require the warning set because, for example, the driver data indicates that the driver is no longer distracted or likely to be unaware of one or more roadway conditions such as the event.

Additional example implementations of the system, method and computer program product for providing situational understanding of one or more unknown roadway conditions that are ahead of a connected vehicle (e.g., the main vehicle) are now described.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a lead vehicle including a first sensor set that is operable to record environment data that describes an event that is external to the lead vehicle and a first geographic location associated with the event, where the lead vehicle includes a first communication unit that is operable to wirelessly transmit the environment data to a network; a main vehicle including a second sensor set that is operable to record driver data that describes one or more actions of a driver of the main vehicle, a second geographic location associated with the main vehicle and a route of the main vehicle, where the main vehicle includes a second communication unit that is operable to wirelessly transmit the driver data to the network and the event is not detectable by the second sensor set or observable by the driver; a computing device that includes a third communication unit that is operable to receive the environment data and the driver data from the network, where the computing device includes a processor that is communicatively coupled to a non-transitory storage medium that stores computer code that, responsive to being executed by the processor, causes the processor to: analyze the first geographic location of the event, the second geographic location of the main vehicle and the route of the main vehicle to determine whether the event is relevant to the main vehicle because (1) the route includes the first geographic location and (2) the second geographic location indicates that the main vehicle has not passed the first geographic location while traveling the route; determine that the event is relevant to the driver of the main vehicle because the driver data indicates that the driver is engaged in one or more actions so that the driver is estimated to not be aware of the event; generate a wireless message that includes notification data that describes the event and the first location; and transmit the wireless message to the network so that the wireless message is receivable by the main vehicle via the network, where the notification data is operable to cause a notification system of the main vehicle to provide a warning set to the driver so that the driver is aware of the event. Other embodiments of this aspect include corresponding computer systems, apparatus, and computer programs recorded on one or more computer storage devices, each configured to perform the actions of the methods.

Implementations may include one or more of the following features. The system where the warning set includes a forewarning at a first time and a warning at a second time. The system where the first time occurs before the second time. The system where a roadside unit receives one or more of the environment data and the driver data prior to its receipt by the computing device, where the received data is received by the roadside unit via one or more Dedicated Short Range Communication messages transmitted by one or more of the lead vehicle and the main vehicle, and where the roadside unit is communicatively coupled to the network and the roadside unit wirelessly relays the received data to the computing device via the network. The system where a roadside unit receives one or more of the environment data and the driver data prior to its receipt by the computing device, where the received data is received by the roadside unit via one or more full-duplex wireless messages transmitted by one or more of the lead vehicle and the main vehicle, and where the roadside unit is communicatively coupled to the network and the roadside unit wirelessly relays the received data to the computing device via the network. The system where the one or more actions of the driver include an eye gaze of the driver being associated with distraction. The system where the one or more actions of the driver include one or more hands of the driver being in an area of the main vehicle associated with distraction. The system where the one or more actions of the driver include operation of one or more of a head unit or an infotainment system of the main vehicle. The system where the notification system does not provide the warning set to the driver if historical data indicates that the driver is aware of the event. The system where one or more of the first geographic location and the second geographic location is determined by a Dedicated Short Range Communication-compliant GPS unit ("DSRC-compliant GPS unit") that is accurate to within plus or minus 1.5 meters of the actual location of one or more of the lead vehicle and the main vehicle. Implementations of the described techniques may include hardware, a method or process, or computer software on a computer-accessible medium.

One general aspect includes a method for providing a warning set to a driver of a vehicle, the method including: analyzing environment data associated with a lead vehicle and driver data associated with a main vehicle to determine whether an event associated with the lead vehicle is relevant to the main vehicle, where the environment data describes a first geographic location of the event and the driver data describes a second geographic location of a main vehicle, a route of the main vehicle and one or more activities of a driver of the main vehicle, where the event is determined to be relevant to the main vehicle because (1) the route includes the first geographic location and (2) the second geographic location indicates that the main vehicle has not passed the first geographic location while traveling the route; determining that the event is relevant to the driver of the main vehicle because the driver data indicates that the driver is engaged in one or more actions so that the driver is estimated to not be aware of the event; generating a wireless message transmittable via a network to the main vehicle, where the wireless message includes notification data that describes the event and the first location and where the notification data is operable to cause a notification system of the main vehicle to provide a warning set to the driver so that the driver is aware of the event. Other embodiments of this aspect include corresponding computer systems, apparatus, and computer programs recorded on one or more computer storage devices, each configured to perform the actions of the methods.

Implementations may include one or more of the following features. The method where the event is not observable by the driver of the main vehicle. The method where the main vehicle includes a sensor set and the event is not detectable by the sensor set. The method where the wireless message is only generated if the event is determined to be relevant to the main vehicle and the driver of the main vehicle. The method where the notification system includes an electronic panel that displays one or more graphics that depict the warning set so that the warning set is viewable by the driver. The method where the notification system includes a speaker that provides audio that describes the warning set so that the warning set is hearable by the driver. Implementations of the described techniques may include hardware, a method or process, or computer software on a computer-accessible medium.

One general aspect includes a computer program product including a non-transitory memory of a computing device storing computer-executable code that, when executed by a processor, causes the processor to: analyze environment data associated with a lead vehicle and driver data associated with a main vehicle to determine whether an event associated with the lead vehicle is relevant to the main vehicle, where the environment data describes a first geographic location of the event and the driver data describes a second geographic location of a main vehicle and a route of the main vehicle, where the event is determined to be relevant to the main vehicle because (1) the route includes the first geographic location and (2) the second geographic location indicates that the main vehicle has not passed the first geographic location while traveling the route; and generating a wireless message transmittable via a network to the main vehicle, where the wireless message includes notification data that describes the event and the first location and where the notification data is operable to cause a notification system of the main vehicle to provide a warning set to the driver so that the driver is aware of the event. Other embodiments of this aspect include corresponding computer systems, apparatus, and computer programs recorded on one or more computer storage devices, each configured to perform the actions of the methods.

Implementations may include one or more of the following features. The computer program product where the environment data further describes one or more activities of a driver of the main vehicle and the wireless message is only generated if the event is relevant to the main vehicle and the driver, where executing the computer-executable code further causes the processor to determine whether the event is relevant to the driver based on whether an analysis of the driver data indicates that the driver is engaged in one or more actions that correspond to an estimate of the driver not being aware of the event. The computer program product where the main vehicle receives the wireless message from a roadside unit. The computer program product where the computing device is included in the roadside unit. The computer program product where the wireless message is transmitted to the main vehicle by the roadside unit via a Dedicated Short Range Communication message. The computer program product where the wireless message is transmitted to the main vehicle by the roadside unit via a full-duplex wireless communication message. The computer program product where the wireless message is transmitted to the main vehicle by the roadside unit via a full-duplex wireless communication message. The computer program product where one or more of the environment data and driver data are transmitted to the computing device by the roadside unit via a network. The computer program product where one or more of the environment data and driver data are initially received by the roadside unit via a Basic Safety Message prior to transmission to the computing device via the network. The computer program product where one or more of the environment data and driver data are initially received by the roadside unit via a Dedicated Short Range Communication message prior to transmission to the computing device via the network. The computer program product where the roadside unit includes a full-duplex coordination system and one or more of the environment data and driver data are initially received by the roadside unit via a full-duplex wireless communication message prior to transmission to the computing device via the network. Implementations of the described techniques may include hardware, a method or process, or computer software on a computer-accessible medium.

One general aspect includes a system including: a lead vehicle including a first sensor set that is operable to record environment data that describes an event that is external to the lead vehicle and a first geographic location associated with the event, where the lead vehicle includes a first communication unit that is operable to wirelessly transmit the environment data to a network; a main vehicle including a second sensor set that is operable to record driver data that describes one or more actions of a driver of the main vehicle and main vehicle data that describes a second geographic location associated with the main vehicle and a route of the main vehicle, where the main vehicle includes a second communication unit that is operable to wirelessly transmit main vehicle data describing the second geographic location of the main vehicle and the route of the main vehicle to the network; a computing device that includes a third communication unit that is operable to receive the environment data and the main vehicle data from the network, where the computing device includes a processor that is communicatively coupled to a non-transitory storage medium that stores computer code that, responsive to being executed by the processor, causes the processor to: analyze the first geographic location of the event, the second geographic location of the main vehicle and the route of the main vehicle to determine whether the event is relevant to the main vehicle because (1) the route includes the first geographic location and (2) the second geographic location indicates that the main vehicle has not passed the first geographic location while traveling the route; generate a wireless message that includes event data that describes the event and the first geographic location; and transmit the wireless message to the network so that the wireless message is receivable by the main vehicle via the network; and the main vehicle including a notification system that is operable, responsive to receipt of the wireless message including the event data by the second communication unit, to analyze the driver data to determine that the event is relevant to the driver based on the driver data indicating that the driver is engaged in one or more actions so that the driver is estimated to not be aware of the event and provide a warning set to the driver that describes the event so that the driver is aware of the event. Other embodiments of this aspect include corresponding computer systems, apparatus, and computer programs recorded on one or more computer storage devices, each configured to perform the actions of the methods.

Implementations may include one or more of the following features. The system where the warning set includes a forewarning at a first time and a warning at a second time. The system where the first time occurs before the second time. The system where a roadside unit receives one or more of the environment data and the main vehicle data prior to its receipt by the computing device to form received data including one or more of the environment data and the main vehicle data, where the received data is received by the roadside unit via one or more Dedicated Short Range Communication messages transmitted by one or more of the lead vehicle and the main vehicle, and where the roadside unit is communicatively coupled to the network and the roadside unit wirelessly relays the received data to the computing device via the network. The system where a roadside unit receives one or more of the environment data and the main vehicle data prior to its receipt by the computing device to form received data including one or more of the environment data and the main vehicle data, where the received data is received by the roadside unit via one or more full-duplex wireless messages transmitted by one or more of the lead vehicle and the main vehicle, and where the roadside unit is communicatively coupled to the network and the roadside unit wirelessly relays the received data to the computing device via the network. The system where the one or more actions of the driver include one or more of an eye gaze of the driver being associated with distraction, a head position of the driver being associated with distraction and a head orientation of the driver being associated with distraction. The system where the one or more actions of the driver include one or more hands of the driver being in an area of the main vehicle associated with distraction. The system where the one or more actions of the driver include operation of one or more of a head unit or an infotainment system of the main vehicle. The system where the notification system does not provide the warning set to the driver if historical data indicates that the driver is aware of the event. The system where one or more of the first geographic location and the second geographic location is determined by a DSRC-compliant GPS unit that is accurate to within plus or minus 1.5 meters of the actual location of one or more of the lead vehicle and the main vehicle. Implementations of the described techniques may include hardware, a method or process, or computer software on a computer-accessible medium.

One general aspect includes a method including: analyzing event data associated with a lead vehicle and driver data associated with a main vehicle to determine whether an event associated with the lead vehicle is relevant to the main vehicle, where the event data describes a geographic location of the event and the driver data describes one or more actions of a driver of the main vehicle; determining that the event is relevant to the main vehicle responsive to the driver data indicating that the driver is distracted; generating a warning set for notifying the driver about the event present at the geographic location; and providing the warning set to the driver. Other embodiments of this aspect include corresponding computer systems, apparatus, and computer programs recorded on one or more computer storage devices, each configured to perform the actions of the methods.

One general aspect includes a method including: analyzing environment data associated with a lead vehicle and main vehicle data associated with a main vehicle to determine whether an event associated with the lead vehicle is relevant to the main vehicle, where the environment data describes a first geographic location of the event and the main vehicle data describes a second geographic location of the main vehicle and a route of the main vehicle, where the event is determined to be relevant to the main vehicle because (1) the route includes the first geographic location and (2) the second geographic location indicates that the main vehicle has not passed the first geographic location while traveling the route; and generating a wireless message transmittable via a network to the main vehicle, where the wireless message includes event data that describes the event and the first geographic location and where the event data is operable to cause a notification system of the main vehicle to record driver data describing one or more actions of a driver of the main vehicle and provide a warning set describing the event and the first geographic location to the driver responsive to the driver data indicating that the one or more actions of the driver are associated with distraction. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

A system to provide situational understanding of one or more unknown roadway conditions that are ahead of a connected vehicle may include one or more of the following: a computing system; a lead vehicle; and a main vehicle.

The lead vehicle may be ahead of a main vehicle on a roadway system (but not necessarily traveling on the same road as the main vehicle). The lead vehicle and the main vehicle may include a notification system.

The notification system of the lead vehicle may collect environment data using a sensor set that records the physical environment external to the lead vehicle. The physical environment may include an event that causes traffic congestion on the route being traveled by the main vehicle. The driver of the main vehicle may not be aware of the event. For example, the driver of the main vehicle may be a distance away from the event so that the driver cannot that observe the event. The distance may include fractions of a mile. The distance may include one or more miles. The event may also be outside of sensor range for the one or more sensors of the main vehicle that includes a driver service module; a lead vehicle that is ahead of a main vehicle. The notification system of the lead vehicle may transmit a wireless message to the computing system that includes the environment data collected by the lead vehicle.

The computing system may include a driver service module. The driver service module may provide a service to the main vehicle that informs the driver of the main vehicle about events that are ahead of them on their route. For example, the driver service module may provide transmit a wireless message to the main vehicle that includes notification data that describes the event included in the environment data.

The notification system of the main vehicle may receive the wireless message including the notification data. The notification data may be operable to cause the notification system to provide a warning set to the driver. For example, an electronic panel of the head unit of the vehicle may display a forewarning of the event while the main vehicle is some distance away from the event (e.g., one mile, five miles, or some distance determined to provide the driver of the main vehicle forewarning of the event but not so early that the driver forgets about the event) and, later on, a warning of the event when the main vehicle is closer to the event (one quarter mile, five hundred meters, or some distance determined to provide the driver of the main vehicle enough time to respond to the event without the warning being abrupt for the driver).

Figure 1A:
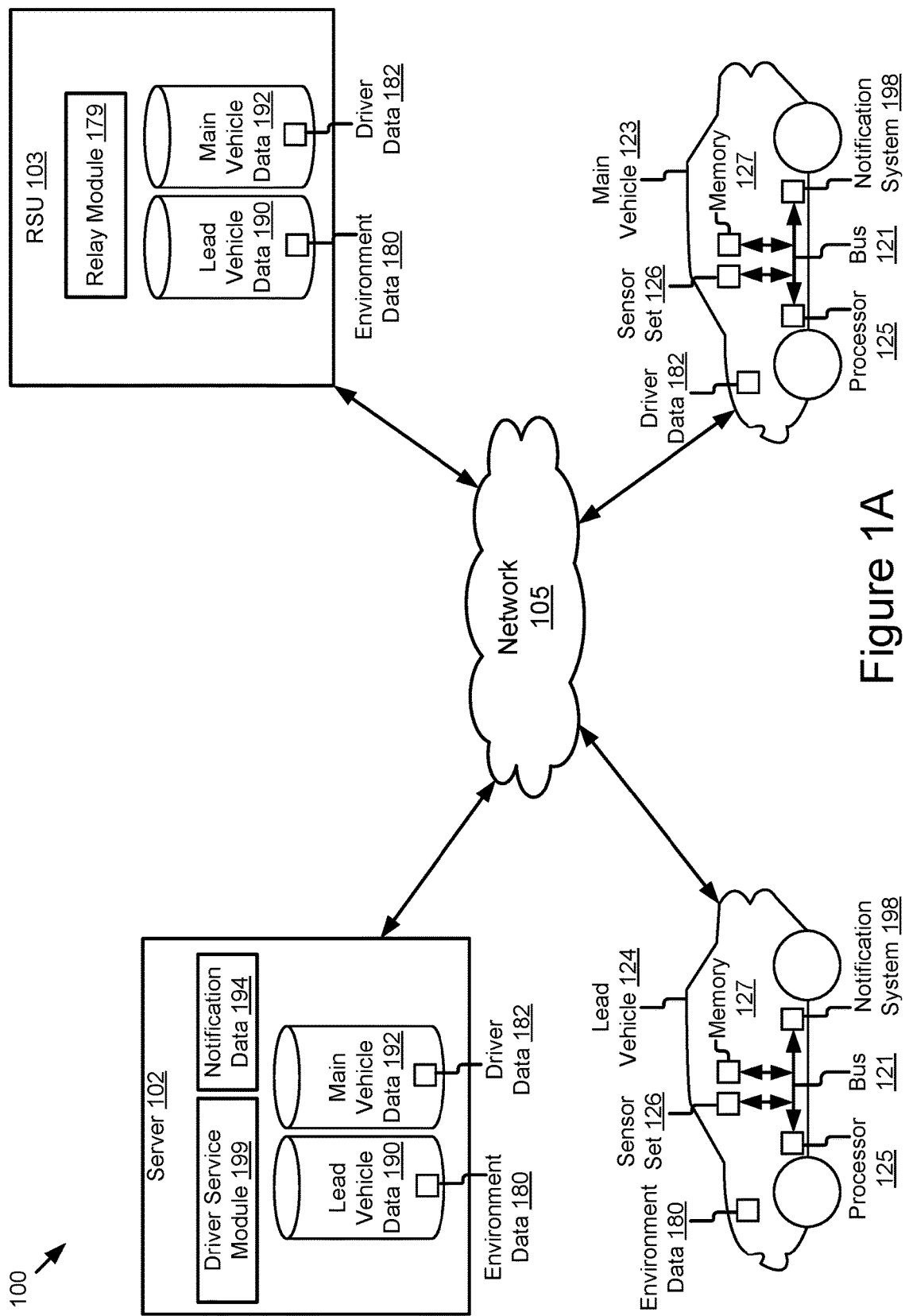
FIG. 1A is a block diagram illustrating an operating environment for a system to provide situational understanding of one or more unknown roadway conditions that are ahead of a connected vehicle according to some implementations.

Referring now to FIG. 1A, depicted is a block diagram illustrating an operating environment 100 for the system to provide situational understanding of one or more unknown roadway conditions that are ahead of a connected vehicle according to some implementations.

The operating environment 100 may include one or more of the following elements: a lead vehicle 124; a server 102; and a main vehicle 123. These elements of the operating environment 100 may be communicatively coupled to one another via a network 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, Dedicated Short Range Communication (DSRC), full-duplex wireless communication (as described in U.S. patent application Ser. No. 14/471,387 filed on Aug. 28, 2014 and entitled "Full-Duplex Coordination System," the entirety of which is herein incorporated by reference), etc. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks. The network 105 may include a Wi-Fi™ network.

The lead vehicle 124 may include a car, a truck, a sports utility vehicle, a bus, a semi-truck, a drone or any other roadway-based conveyance.

In some implementations, the lead vehicle 124 may include an autonomous vehicle or a semi-autonomous vehicle.

In some implementations, the lead vehicle 124 is a connected vehicle. For example, the lead vehicle 124 is communicatively coupled to the network 105 and can send and receive messages via the network 105, and this quality may make the lead vehicle 124 a "connected vehicle."

The lead vehicle 124 may include one or more of the following elements: a processor 125; a sensor set 126; a memory 127 and a notification system 198. These elements may be communicatively coupled to one another via a bus 121. The memory 127 may store data or information. For example, the memory 127 may store the environment data 180.

The processor 125 includes an arithmetic logic unit, a microprocessor, a general purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1A includes a single processor 125 present in the lead vehicle 124, multiple processors may be included. The processor 125 may include a graphical processing unit. Other processors, operating systems, sensors, displays, and physical configurations may be possible.

In some implementations, the processor 125 may be an element of a processor-based computing device of the lead vehicle 124. For example, the lead vehicle 124 may include one or more of the following processor-based computing devices and the processor 125 may be an element of one of these devices: an onboard vehicle computer; an electronic control unit; a navigation system; an advanced driver assistance system and a head unit.

In some implementations, the sensor set 126 may include one or more sensors. The sensor set 126 may collect sensor data. The sensor data may describe, for example, a physical environment external to the lead vehicle 124 or a physical environment internal to the lead vehicle 124. For example, the sensor set 126 may include one or more external sensors that measure the physical environment external to the lead vehicle 124 and one or more internal sensors that monitor and measure the actions of the driver of the lead vehicle 124.

In some implementations, the sensor set 126 may include one or more sensors that are operable to measure the physical environment outside of the lead vehicle 124. For example, the sensor set 126 may record one or more physical characteristics of the physical environment that is proximate to the lead vehicle 124.

In some implementations, the sensor set 126 may include one or more sensors that are operable to measure the physical environment inside of the lead vehicle 124. For example, the sensor set 126 may record an eye gaze of the driver of the lead vehicle 124 (e.g., using an internal camera), where the driver's hands are located (e.g., using an internal camera) and whether the driver is touching a head unit or infotainment system of the lead vehicle 124 with their hands (e.g., using a feedback loop from the head unit or infotainment system that indicates whether the buttons, knobs or screen of these devices is being engaged by the driver).

In some implementations, the sensor set 126 may include one or more of the following vehicle sensors: a camera (internal or external); a LIDAR sensor; a laser altimeter; a navigation sensor (e.g., a global positioning system sensor of the DSRC-compliant GPS unit); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data that describes one or more locations of vehicle (e.g., the lead vehicle 124) at one or more different times, images or other measurements of the vehicle environment and objects or other vehicles present in the vehicle environment, etc. The vehicle environment may include the area outside of the vehicle that is proximate to the vehicle. For example, the lead vehicle 124 may be in motion on a roadway and the vehicle environment may include other vehicles that are in front of the lead vehicle 124, behind the lead vehicle 124, beside the lead vehicle 124 or one or more car lengths away from the lead vehicle 124. The sensor data may stored in the memory 127.

In some implementations, the sensor data may be included in the environment data 180. The environment data 180 may describe an event present in the physical environment of the lead vehicle 124. The event may be any roadway condition that causes roadway congestion, is an indication of roadway congestion or is a result of roadway congestion. The environment data 180 may also store a geographic location of the lead vehicle 124. The geographic location of the lead vehicle 124 may be determined, for example, by the global positioning system sensor of the DSRC-compliant GPS unit included in the sensor set 126. The environment data 180 may be stored in the memory 127.

The memory 127 may include a non-transitory storage medium. The memory 127 may store instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some implementations, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The notification system 198 may include code and routines that are operable, when executed by the processor 125, to cause the processor 125 to aggregate environment data 180 that describes an event and a geographic location of the lead vehicle 124 and transmit a wireless message including the environment data 180 to the network 105.

The notification system 198 may include other functionality described below with reference to the main vehicle 123. For example, the lead vehicle 124 and the main vehicle 123 may each include a separate notification system 198 and the notification system 198 may provide different functionality depending on whether the it is present in a lead vehicle 124 or a main vehicle 123.

The notification system 198 is described in more detail below with reference to FIGS. 1D, 3, 4 and 5.

The lead vehicle 124 and the main vehicle 123 may include similar elements. An example difference of the lead vehicle 124 and the main vehicle 123 may include that the lead vehicle 124 is geographically located ahead of the main vehicle 123 relative to a route of travel of the main vehicle 123. For example, the lead vehicle 124 is located at a point of travel in the route of the main vehicle 123 which has not been reached yet by the main vehicle 123 during the current trip. A main vehicle 123 may be classified or described as a "main vehicle" relative to the lead vehicle 124 because of their respective geographic locations, but the main vehicle 123 itself may be classified or described as a "lead vehicle" relative to some other connected vehicle.

In another example difference of the lead vehicle 124 and the main vehicle 123, the notification system 198 of a lead vehicle 124 may collect environment data 180 which describes (at least in part) the vehicle environment external to the lead vehicle 124 whereas the notification system 198 of a main vehicle 123 may collect driver data 182 that describes (at least in part) the environment internal to the main vehicle 123.

The driver data 182 may include sensor data collected by one or more internal sensors included in the sensor set 126. An internal sensor may be a sensor that measures the internal environment of the vehicle. By contrast, the environment data 180 may include sensor data collected by one or more external sensors included in the sensor set 126. An external sensor may be a sensor that measures the environment external to the vehicle.

The main vehicle 123 may include a car, a truck, a sports utility vehicle, a bus, a semi-truck, a drone or any other roadway-based conveyance.

In some implementations, the main vehicle 123 may include an autonomous vehicle or a semi-autonomous vehicle.

In some implementations, the main vehicle 123 is a connected vehicle. For example, the main vehicle 123 is communicatively coupled to the network 105 and can send and receive messages via the network 105, and this quality may make the main vehicle 123 a "connected vehicle."

The main vehicle 123 may include one or more of the following elements: a processor 125; a sensor set 126; a memory 127; and a notification system 198. These elements may be communicatively coupled to one another via a bus 121. The memory 127 may store data or information. For example, the memory 127 may store the driver data 182.

The driver data 182 may describe the internal environment of the main vehicle 123. In some implementations, the driver data 182 may describe one or more actions of the driver of the main vehicle 123. For example, the driver data 182 may describe a gaze of the driver of the main vehicle 123 (e.g., where is the driver looking and for how long are they looking there), a location of the driver's hands (e.g., where are the driver's hands located and how long are they located there) and whether the driver is operating a head unit or infotainment system of the main vehicle 123. These actions of the driver may indicate that the driver is distracted or not likely to observe a roadway condition such as the event described by the environment data 180.

At least some of the sensor data of the sensor set 126 may be stored in the driver data 182. For example, the driver data 182 may include the sensor data that describes the internal environment of the main vehicle 123 (or the lead vehicle 124 in some implementations). The main vehicle 123 may include environment data 180 as well. At least some of the sensor data of the sensor set 126 may be stored in the environment data 180. For example, the environment data 180 may store the sensor data that describes the external environment of the main vehicle 123 (or the lead vehicle 124 in some implementations).

Figure 1B:
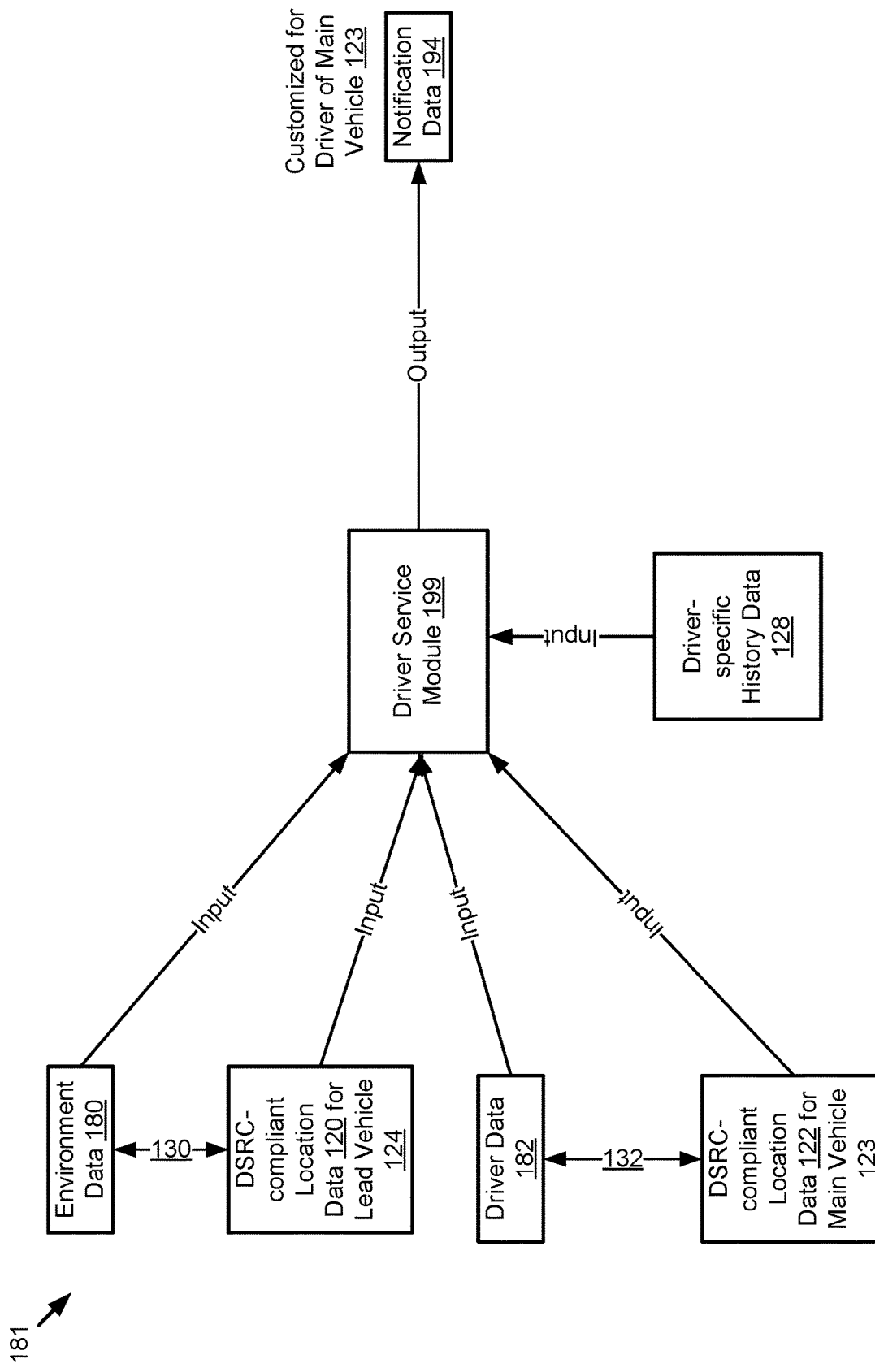
FIG. 1B is a block diagram illustrating a process flow diagram for a driver service module according to some implementations.

The driver data 182 may also include digital data that describes one or more of the following: a geographic location of the main vehicle 123; a route of the main vehicle 123; a velocity of the main vehicle 123; a heading of the main vehicle 123; and one or more historical routes (or journeys) of the main vehicle 123 or the driver of the main vehicle 123 (see, e.g., the driver-specific history data 128 depicted in FIG. 1B).

In some implementations, the geographic location of the main vehicle 123, the velocity of the main vehicle 123 and the heading of the main vehicle 123 may be determined by a DSRC-compliant GPS unit of the main vehicle 123 (as included in the sensor set 126 described above with reference to the lead vehicle 124).

In some implementations, the historical routes of the main vehicle 123 may describe one or more past journeys of the main vehicle 123.

In some implementations, the geographic location of the main vehicle 123 may indicate that the main vehicle 123 has not yet arrived at the geographic location of an event observed by the sensor set 126 of the lead vehicle 124.

In some implementations, the velocity and heading may indicate how much time will need to pass before the main vehicle 123 is present at the geographic location of the event.

In some implementations, the historical routes of the main vehicle 123 may indicate which events may be familiar to the driver of the main vehicle 123. For example, if the driver has seen an event described by the environment data 180 one or more times (as indicated by an occurrence threshold) or within some time frame (as indicated by a time threshold) then the driver of the main vehicle 123 may not be warned about the existence of the event.

The processor 125, sensor set 126 and bus 121 were described above with reference the lead vehicle 124, and so, those descriptions will not be repeated here.

The notification system 198 was also described above with reference to the lead vehicle 124. When a vehicle is a main vehicle 123 the notification system 198 may have different functionality than when that vehicle is a lead vehicle 124. For example, the notification system 198 may include code and routines that, when executed by the processor 125, cause the processor 125 to receive notification data 194 from the network and provide a warning set to the driver of the main vehicle. The warning set may include a forewarning that occurs at a first time and a warning that occurs at a second time. The second time may occur after the first time. The warning set is described in more detail below with reference to FIG. 5.

The server 102 may include a processor-based computing device. For example, the server 102 may include a computer, laptop, mainframe, or some other processor-based computing device. In some implementations, the server 102 is a hardware server. The server 102 may include functionality to enable it to send and receive messages via the network 105.

The server 102 may include one or more of the following elements: lead vehicle data 190; main vehicle data 192; a driver service module 199; and notification data 194.

One or more of the following elements of the server 102 may be stored on a non-transitory memory of the server 102 that is similar to the memory 127: the lead vehicle data 190; the main vehicle data 192; the notification data 194. In some implementations, the driver service module 199 may include code and routines that are stored on the memory of the server 102 as well.

Although not pictured in FIG. 1A, the server 102 may include a processor that is similar to the processor 125. The processor of the server 102 may be communicatively coupled to the memory of the server 102 and adapted to access and execute any data or information stored thereon.

The lead vehicle data 190 includes one or more sets of environment data 180 transmitted by one or more lead vehicles 124. The server 102 may receive the environment data 180 from the network 105. The lead vehicle data 190 may include environment data 180 from dozens, hundreds, thousands or millions of lead vehicles 124.

In some implementations, the environment data 180 included in the lead vehicle data 190 may be organized based on the geographic locations of the lead vehicles 124 that provided the environment data 180. For example, each set of environment data 180 may include location data that describes the location the lead vehicle 124 that transmitted that set of environment data 180.

In some implementations, the lead vehicle data 190 may be indexed based on the location data of the lead vehicles 124 so that each set of environment data 180 may be searched based on a location of a main vehicle 123, or a route of a main vehicle 123, so that the driver service module 199 may determine whether the lead vehicle data 190 includes environment data 180 that is relevant to a main vehicle 123 because it describes an event or a lead vehicle 124 that is geographically near the main vehicle 123 or on a route of the main vehicle 123.

The main vehicle data 192 includes one or more sets of driver data 182 transmitted by one or more main vehicles 123. The server 102 may receive the driver data 182 from the network 105. The main vehicle data 192 may include driver data 182 from dozens, hundreds, thousands or millions of main vehicles 123.

In some implementations, the driver data 182 included in the main vehicle data 192 may be organized based on the geographic locations of the main vehicles 123 that provided the driver data 182. For example, each set of driver data 182 may include location data that describes the location the main vehicle 123 that transmitted that set of driver data 182.

In some implementations, the main vehicle data 192 may be indexed based on the location data associated with the main vehicles 123 so that each set of driver data 182 may be searched based on a location of an event, or a location of a lead vehicle 124, so that the driver service module 199 may determine whether an event described by a set of environment data 180 is relevant to a main vehicle 123 because it is geographically near the main vehicle 123 or on a route of the main vehicle 123.

In some implementations, the driver service module 199 may include code and routines that are operable, when executed by a processor of the server 102, to cause the processor to determine whether one or more events described by the environment data 180 are relevant to a main vehicle 123. For example, an event may be relevant to a main vehicle 123 if it is located on a route of the main vehicle 123 (as described by the driver data 182) and the main vehicle 123 has not yet passed the location of the event (as estimated based on the location of the main vehicle 123 relative to the location of the event or lead vehicle, and the combination of the heading and velocity of the main vehicle 123). An example implementation of determining whether an event is relevant to a main vehicle 123 is described below with reference to FIG. 1B and FIG. 4.

In some implementations, the driver service module 199 may include code and routines that are operable, when executed by a processor of the server 102, to cause the processor to determine whether one or more events described by the environment data 180 are relevant to a driver of a main vehicle 123. For example, an event may be relevant to a driver of a main vehicle 123 if (1) the event is relevant to the main vehicle 123 (as described above and with reference to FIG. 1B) and (2) the driver data 182 indicates that the driver is distracted or likely to be distracted based on the one or more activities of the driver inside the interior of the main vehicle 123. An example implementation of determining whether an event is relevant to a driver of a main vehicle 123 is described below with reference to FIG. 1C and FIG. 4.

The driver service module 199 may generate the notification data 194. In some implementations, the notification data 194 may describe (1) an event that is relevant to a particular main vehicle 123 and a particular driver of the main vehicle 123 and (2) the geographic location of the event.

The driver service module 199 may generate a wireless message that includes the notification data 194. The wireless message may be transmitted to the network 105. The main vehicle 123 may receive the wireless message and respond to the event.

In some implementations, the notification data 194 may be operable to cause the notification system 198 of the main vehicle 123 to provide a set of warnings to the driver of the main vehicle 123 so that the driver may be made aware of the event in sufficient time for (1) the driver to respond to the event or (2) an advanced driver assistance system ("ADAS") of the main vehicle 123 to respond to the event.

In some implementations, the warning set may include a forewarning of the event at a first time followed by a warning of the event at a second time. In this way the driver may be made aware of the event in stages so that they do not forget about the event or feel that the warning was provided too abruptly.

In some implementations, the driver service module 199 may only generate the wireless message that includes the notification data 194 (or may only generate the notification data 194) if the event is both (1) relevant to the main vehicle 123 and (2) relevant to the driver of the main vehicle 123. In this way, the driver service module 199 may consider factors that are both: (1) external to the main vehicle 123 (e.g., the environment data 180 used to determine the relevancy of the event to the main vehicle 123); and internal to the main vehicle 123 (e.g., the driver data 182 used to determine the relevancy of the event to the driver of the main vehicle 123).

The driver service module 199 is described in more detail below with reference to FIG. 2.

In some implementations one or more of a main vehicle 123 or a lead vehicle 124 may not have access to the network 105. For example, they may be traveling in a tunnel or may be otherwise unable to access the network. In these examples as well as others they may provide one or more of the environment data 180 and the driver data 182 to a roadside service unit 103 ("RSU 103").

The RSU 103 may be equipped with a communication unit as described below with reference to FIG. 2 and FIG. 3. The communication unit may include a Dedicated Short Range Communication ("DSRC") unit including a DSRC receiver and a DSRC transceiver which enable the RSU 103 to send and receive wireless messages via the DSRC protocol ("DSRC messages"). A device that includes a DSRC unit and may send and receive DSRC messages is referred to herein as being DSRC-enabled.

In some implementations, one or more of the main vehicle 123 and the lead vehicle 124 may be DSRC-enabled. The main vehicle 123 or the lead vehicle 124 may transmit DSRC messages to the RSU 103 including the environment data 180 or the driver data 182.

In some implementations, one or more of the main vehicle 123, the lead vehicle 124 and the RSU 103 may include a full-duplex coordination system as described in U.S. patent application Ser. No. 14/471,387 filed on Aug. 28, 2014 and entitled "Full-Duplex Coordination System." The main vehicle 123 or the lead vehicle 124 may transmit full-duplex wireless messages to the RSU 103 that include the driver data 182 or the environment data 180, respectively. In this way the RSU 103 may receive the driver data 182 or the environment data 180 via a full-duplex wireless message.

In some implementations, some of the data received by the RSU 103 may be received via DSRC while other portions of the data received by the RSU 103 may be received via full-duplex wireless message.

In some implementations, some of the data received by the RSU may be received via the network 105 as well. For example, the server 102 may be out of service or otherwise not reachable via the network 105 so that a main vehicle 123 or a lead vehicle 124 may address a wireless message that includes the driver data 182 or the environment data 180 to the RSU 103 instead of the server 102.

The relay module 179 of the RSU 103 may include code and routines that, when executed by a processor of the RSU 103, may cause the processor to aggregate the environment data 180 to form the lead vehicle data 190 and aggregate the driver data 182 to form the main vehicle data 192.

The relay module 179 of the RSU 103 may include code and routines that, when executed by a processor of the RSU 103, may cause the processor to transmit one or more of the lead vehicle data 190 and the main vehicle data 192 to the network 105. The server 102 may receive the transmitted data (e.g., the lead vehicle data 190 or the main vehicle data 192) from the network 105.

In some implementations, the driver service module 199 may be an element of the RSU 103. This approach may be beneficial since the RSU 103 may be able to provide notification data 194 to a main vehicle 123 faster than a server 102 because, for example, of the time required to transmit wireless messages via the network 105 may be longer versus the time required to transmit DSRC or full-duplex wireless messages between the vehicles and the RSU 103.

In some implementations, one or more of the relay module 179, the notification system 198 and the driver service module 199 may be implemented using hardware including a field-programmable gate array ("FPGA") or an application-specific integrated circuit ("ASIC"). In some other implementations, one or more of the relay module 179, the notification system 198 and the driver service module 199 may be implemented using a combination of hardware and software. One or more of the relay module 179, the notification system 198 and the driver service module 199 may be stored in a combination of the devices (e.g., servers or other devices), or in one of the devices.

In some implementations, the wireless messages described above may be encrypted themselves or transmitted via an encrypted communication provided by the network 105. In some implementations, the network 105 may include an encrypted virtual private network tunnel ("VPN tunnel"). In some implementations, one or more of the relay module 179, the notification system 198 and the driver service module 199 may include encryption keys for encrypting messages and decrypting the wireless messages described herein.

Referring now to FIG. 1B, depicted is a block diagram illustrating a process flow diagram 181 for a driver service module 199 according to some implementations. The process flow diagram 181 may depict a determination of whether an event described by a particular set of environment data 180 is relevant to a particular main vehicle 123.

Figure 3:
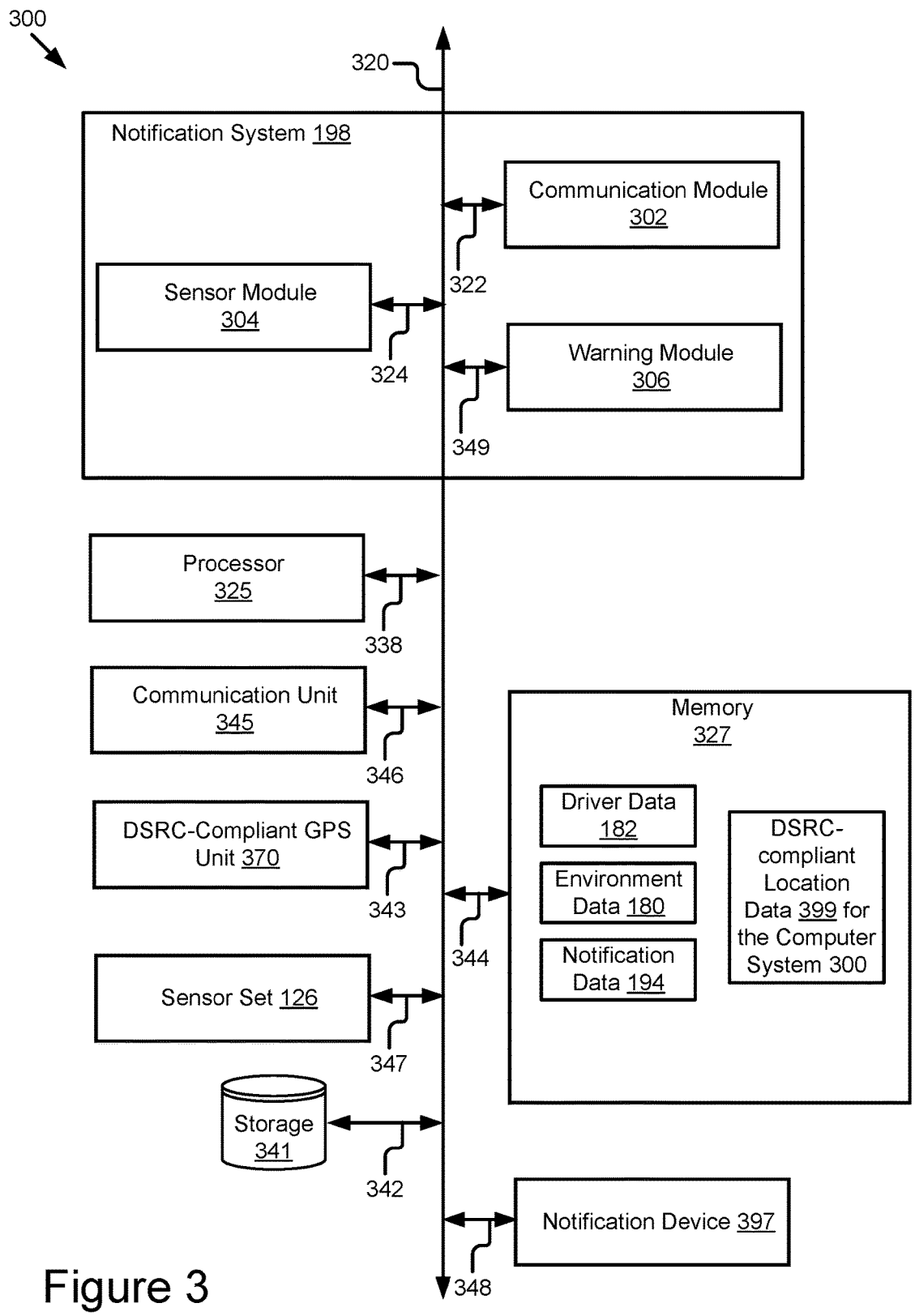
FIG. 3 is a block diagram illustrating an example computer system including a notification system according to some implementations.

In some implementations, one or more of the main vehicle 123 and the lead vehicle 124 may include a DSRC-compliant GPS unit (see, for example, the DSRC-compliant GPS unit 370 depicted in FIG. 3). A DSRC-compliant GPS unit may include hardware that wirelessly communicates with a GPS satellite to retrieve DSRC-compliant location data that describes a location of the vehicle which includes the DSRC-compliant GPS unit (e.g., the main vehicle 123 or the lead vehicle 124).

DSRC-compliant location data may describe the location of a vehicle that includes a DSRC-compliant GPS unit to a lane-level degree of precision. The DSRC standard requires that location data be precise enough to infer if two vehicles (such as the lead vehicle 124 and another vehicle on the same roadway as the lead vehicle 124) are in the same lane. In this way, the DSRC-compliant location for the lead vehicle 124 may beneficially indicate whether an event described by the environment data 180 for the lead vehicle 124 is in the same lane of travel as the main vehicle 123 as indicated by the DSRC-compliant location for the main vehicle 123.

The DSRC-compliant GPS unit of a vehicle may be operable to identify, monitor and track its two-dimensional position within 1.5 meters of its actual position 68% of the time under an open sky. Since lanes of a roadway are typically no less than 3 meters wide, whenever the two dimensional error of the DSRC-compliant location data is less than 1.5 meters the driver service module 199 may analyze the DSRC-compliant location data for the main vehicle 123 and the lead vehicle 124 and determine what lane of the roadway these vehicles are traveling in based on the relative positions of vehicles on the roadway. This DSRC-compliant location data may then be used in analysis by the driver service module 199 such as those described below or above.

The process flow diagram 181 depicts the following elements as inputs to the driver service module 199: environment data 180 for a particular lead vehicle 124 that describes an event; DSRC-compliant location data 120 for the particular lead vehicle 124; driver data 182 for a particular main vehicle 123; and DSRC-compliant location data 122 for the particular main vehicle 123.

The DSRC-compliant location data 120 for the lead vehicle 124 may be associated 130 with the environment data 180 for that particular lead vehicle 124. The DSRC-compliant location data 120 for the lead vehicle 124 may be included in the environment data 180. The DSRC-compliant location data 120 may describe the location of the lead vehicle 124 to an accuracy of plus or minus 1.5 meters relative to the actual location of the lead vehicle 124.

The DSRC-compliant location data 122 for the main vehicle 123 may be associated 132 with the driver data 182 for that particular main vehicle 123. The DSRC-compliant location data 122 for the main vehicle 123 may be included in the driver data 182. The DSRC-compliant location data 122 may describe the location of the main vehicle 123 to an accuracy of plus or minus 1.5 meters relative to the actual location of the main vehicle 123.

In some implementations, the sensor set of the lead vehicle 124 may include a range finder such as a LIDAR sensor. The range finder may be used by the notification system of the lead vehicle 124 to determine range data that describes a distance from the lead vehicle 124 to the event. The range finder may also be used by the notification system of the lead vehicle 124 to determine orientation data that describes the orientation of the event relative to the heading of the lead vehicle 124. The orientation of the event may be described by the orientation data in terms of degrees relative to some fixed point within the lead vehicle 124.

In some implementations, the range data and the orientation data may be included in the environment data 180 for an event.

In some implementations, the range data may be combined with the DSRC-compliant location data 120 for the lead vehicle 124 by the driver service module 199 to identify the location of the event relative to the location of the lead vehicle 124.

In some implementations, the orientation data may be used by the driver service module 199 to determine whether the event is located in the same as the lead vehicle 124. For example, the driver service module 199 may apply trigonometry to analyze the degrees of orientation of the event relative to the location and heading of the lead vehicle 124 to determine whether the event is present in the same lane as the lead vehicle 124.

In this way, the DSRC-compliant location data 120 for the lead vehicle 124 may be combined with range data and orientation data by the driver service module 199 to determine a location of the event (accurate to within plus or minus 1.5 meters) and whether the event is within the same lane of travel as the lead vehicle 124 (and the main vehicle 123) as indicated by the DSRC-compliant location data 120 for the lead vehicle 124 (and the DSRC-compliant location data 122 for the main vehicle 123).

The driver service module 199 may determine if an event described by the environment data 180 is relevant to a main vehicle 123. For example, if the event (as described by the environment data 180) is located on a route of the main vehicle 123 (as described by the route of the main vehicle 123 included in the driver data 182) and the main vehicle 123 has not yet passed the location of the event (as described by the DSRC-compliant location data 120 for the lead vehicle 124 and the DSRC-compliant location data 122 for the main vehicle 123), then the driver service module 199 may determine that the event is relevant to the main vehicle 123.

The driver service module 199 may analyze the driver data 182 to determine whether the event is relevant to the driver of the main vehicle 123. For example, the driver data 182 may indicate that the driver is distracted or likely to not observe the event because they are engaged in one or more activities that correspond to driver distraction. The driver service module 199 may determine that the event is relevant to the driver of the main vehicle 123 based on an estimate that the driver is distracted as indicated by the driver data 182. The analysis to determine whether an event is relevant to a driver of a main vehicle 123 is described in more detail below with reference to FIG. 1C.

The driver service module 199 may output the notification data 194 responsive to the inputs provided to the driver service module 199. In some implementations, the driver service module 199 may only output the notification data 194 if the event is relevant to both the main vehicle 123 and the driver of the main vehicle 123.

In some implementations, the driver service module 199 may analyze the environment data 180 to determine the type of event included in the environment data 180. For example, the driver service module 199 may include an ontology that is used to analyze the sensor data included in the environment data 180 to determine the type of event.

In some implementations, the notification data 194 outputted by the driver service module 199 may by customized by the driver service module 199 to describe the type of event. For example, the notification data 194 may cause the notification system 198 to provide a warning to the driver of the main vehicle 123 that describes the type of event as "a car wreck is ahead" or some other description for some other type of event. The notification data 194 may further provide a description of a recommended action. For example, the notification data 194 may suggest that the driver change lanes to a specified lane less affected by the event or change their route of travel altogether.

Events may be static in nature (e.g., a location of the start of a car pool lane) or dynamic in nature (e.g., an ice patch on a roadway). In some implementations, the driver data 182 may include historical data 128 that is provided as an input to the driver service module 199. The history data 128 may describe the past journeys or routes of travel of the main vehicle 123 or the driver of the main vehicle 123. If, for example, (1) the event described by the environment data 180 is determined to be static in nature (as indicated, for example, by the ontological analysis of the environment data 180 provided by the driver service module 199) and (2) the history data 128 of the driver indicates that the driver or the main vehicle 123 has driven past this event a specified number or times (as indicated by an occurrence threshold) or within a specified time frame (as specified by the timing threshold), then the driver service module 199 may determine that the notification data 194 will not be generated since the driver of the main vehicle 123 is estimated to be aware of the event.

Figure 1C:
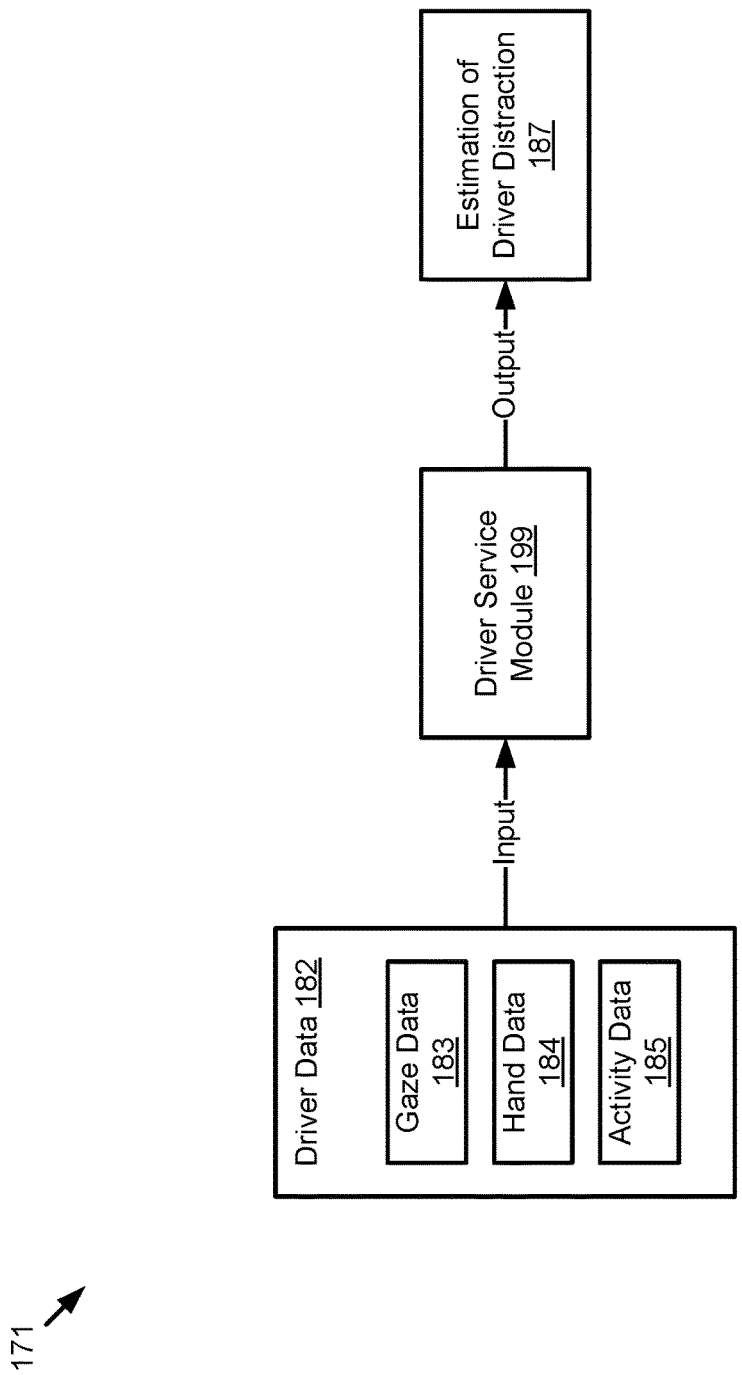
FIG. 1C is a block diagram illustrating a process flow diagram for a driver service module according to some implementations.

Referring now to FIG. 1C, depicted is a block diagram illustrating a process flow diagram 171 for a driver service module 199 according to some implementations. The driver service module 199 may determine an estimate 187 of whether the driver of the main vehicle 123 is distracted based on the driver data 182.

The driver data 182 may describe one or more actions of the driver. For example, the driver data 182 may include one or more of the following: gaze data 183; hand data 184; and activity data 185.

The gaze data 183 may describe the gaze of the driver. The gaze data 183 may be captured by one or more interior cameras. The interior of the main vehicle 123 may be divided into eye gaze zones. The gaze data 183 may describe which eye gaze zone the driver is gazing at and for how long the driver is gazing at this eye gaze zone. Certain eye gaze zones may be associated with driver distraction. For example, if the driver is gazing at a passenger in the vehicle then they may be distracted. If the gaze data 183 indicates that the driver is gazing at an eye gaze zone associated with distraction for a period of time that exceeds a time threshold for that eye gaze zone, then the driver service module 199 may output an estimate 187 that the driver is distracted.

The hand data 184 may describe the hand placement of the driver of the main vehicle. The hand data 184 may be captured by one or more interior cameras. The interior of the main vehicle 123 may be divided into hand placement zones. The hand data 184 may describe which hand placement zone the driver's hands are located in and for how long the driver leaves their hands in this hand placement zone. Certain hand placement zones may be associated with driver distraction. For example, if the driver's hands are placed on the knobs of a head unit or infotainment system then the driver may be distracted. If the hand data 184 indicates that the driver's hands are located in a hand placement zone associated with distraction for a period of time that exceeds a time threshold for that hand placement zone, then the driver service module 199 may output an estimate 187 that the driver is distracted.

The activity data 185 may describe the whether the buttons, knobs, touchscreen or some other interface of the head unit or infotainment system of the vehicle is being engaged by the driver. The activity data 185 may be captured by one or more feedback loops of the head unit or infotainment system. Engagement with the head unit or infotainment system may be associated with driver distraction. For example, if the driver is engaged with the infotainment system then the driver may be distracted. If the activity data 185 indicates that the driver is engaged with the head unit or infotainment system for a period of time that exceeds a time threshold, then the driver service module 199 may output an estimate 187 that the driver is distracted.

In some implementations, one or more of the gaze data 183, hand data 184 and activity data 185 may be provided as inputs to the driver service module 199. The driver service module 199 may generate as an output an estimation 187 of whether the driver is distracted.

In some implementations, the driver service module 199 may analyze one or more of the gaze data 183, the hand data 184 and the activity data 185 to estimate 187 if the driver is distracted based on one or more of the gaze data 183, the hand data 184 and the activity data 185.

In some implementations, the gaze data 183 or the hand data 184 may describe a head position of the driver being associated with distraction or a head orientation of the driver being associated with distraction. For example, the head position or head orientation of the driver may be determined based on one or more images of the driver captured by an internal camera included in the sensor set 126 of the main vehicle 123.

In some implementations, the driver service module 199 may generate a confidence factor that the driver is distracted. For example, all three of the gaze data 183, hand data 184 and activity data 185 may be considered as factors that indicate driver activity with a head unit or infotainment system (e.g., the driver is gazing at the head unit while their hands are placed on the head unit and the feedback loop of the head unit indicates that one or more buttons are being pressed). The confidence factor that the driver is distracted may increase as more of these factors (gaze data 183, hand data 184, activity data 185) indicate driver distraction.

In some implementations, a threshold of confidence may be required to estimate that an event is relevant to the driver. For example, at least two out of the three factors must indicate driver distraction before the estimate 187 indicates driver distraction such than an event is relevant to the driver.

Figure 1D:
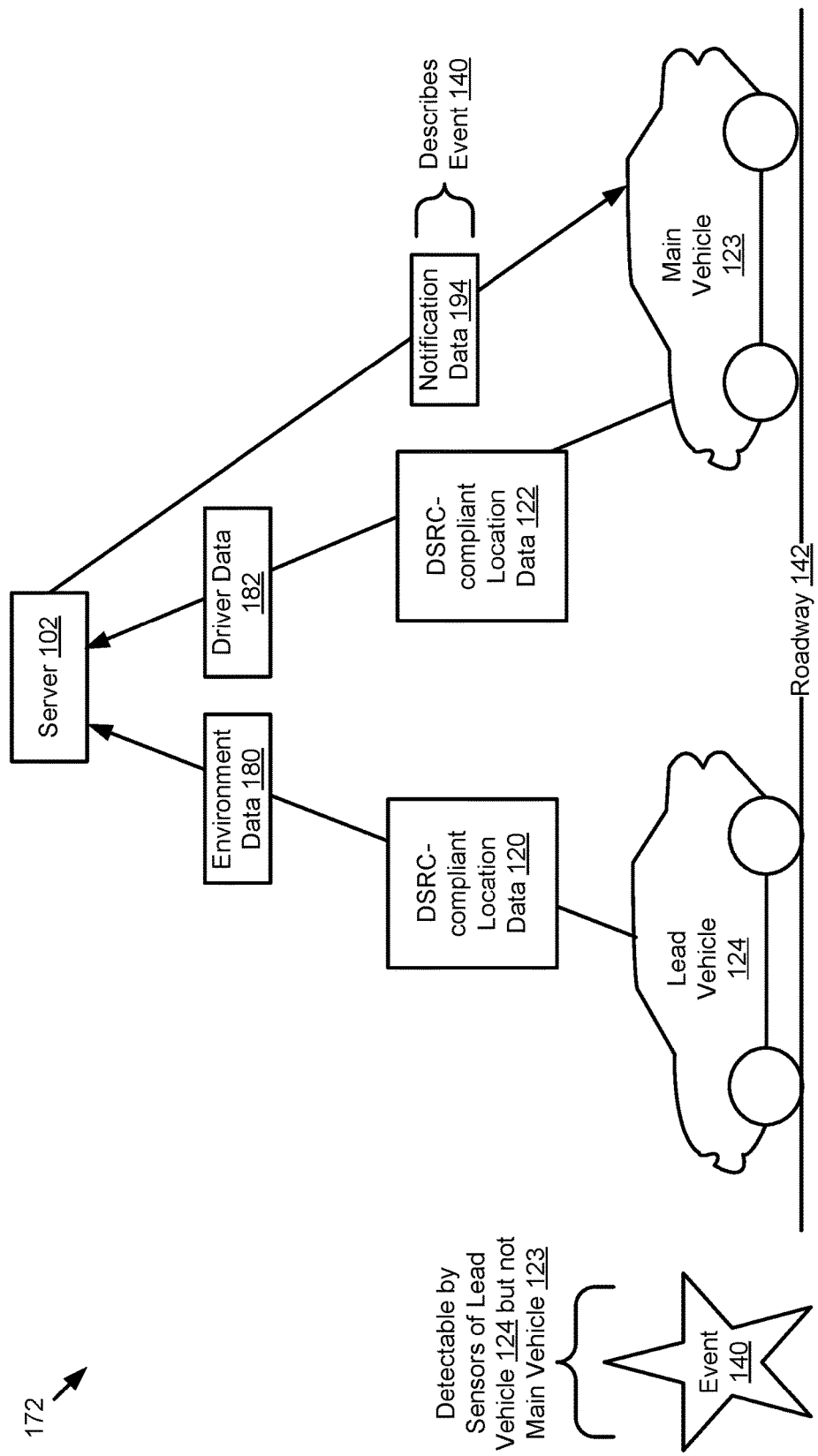
FIG. 1D is a block diagram illustrating a process flow diagram for a system to provide situational understanding of one or more unknown roadway conditions that are ahead of a connected vehicle according to some implementations.

Referring now to FIG. 1D, depicted is a block diagram illustrating a process flow diagram 172 for a system to provide situational understanding of one or more unknown roadway conditions that are ahead of a connected vehicle according to some implementations.

A lead vehicle 124 may detect an event 140 on the roadway 142. The event may be detectable by one or more sensors of the lead vehicle 124 but not detectable by one or more sensors of the main vehicle 123 (or the driver of the main vehicle 123). For example, the event may be outside of sensor range for the sensor set of the main vehicle 123.

The lead vehicle 124 may transmit one or more wireless messages to the server 102. The one or more wireless messages may include environment data 180 that describes the event 140 and DSRC-compliant location data 120 that describes the location of the lead vehicle 124.

A main vehicle 123 may transmit one or more wireless messages to the server 102. The one or more wireless messages may include driver data 182 that describes one or more activities of the driver of the main vehicle 123 and DSRC-compliant location data 122 that describes the location of the main vehicle 123.

The server 102 may output a wireless message to the main vehicle 123. The wireless message may include notification data 194 that describes the event 140.

Figure 2:
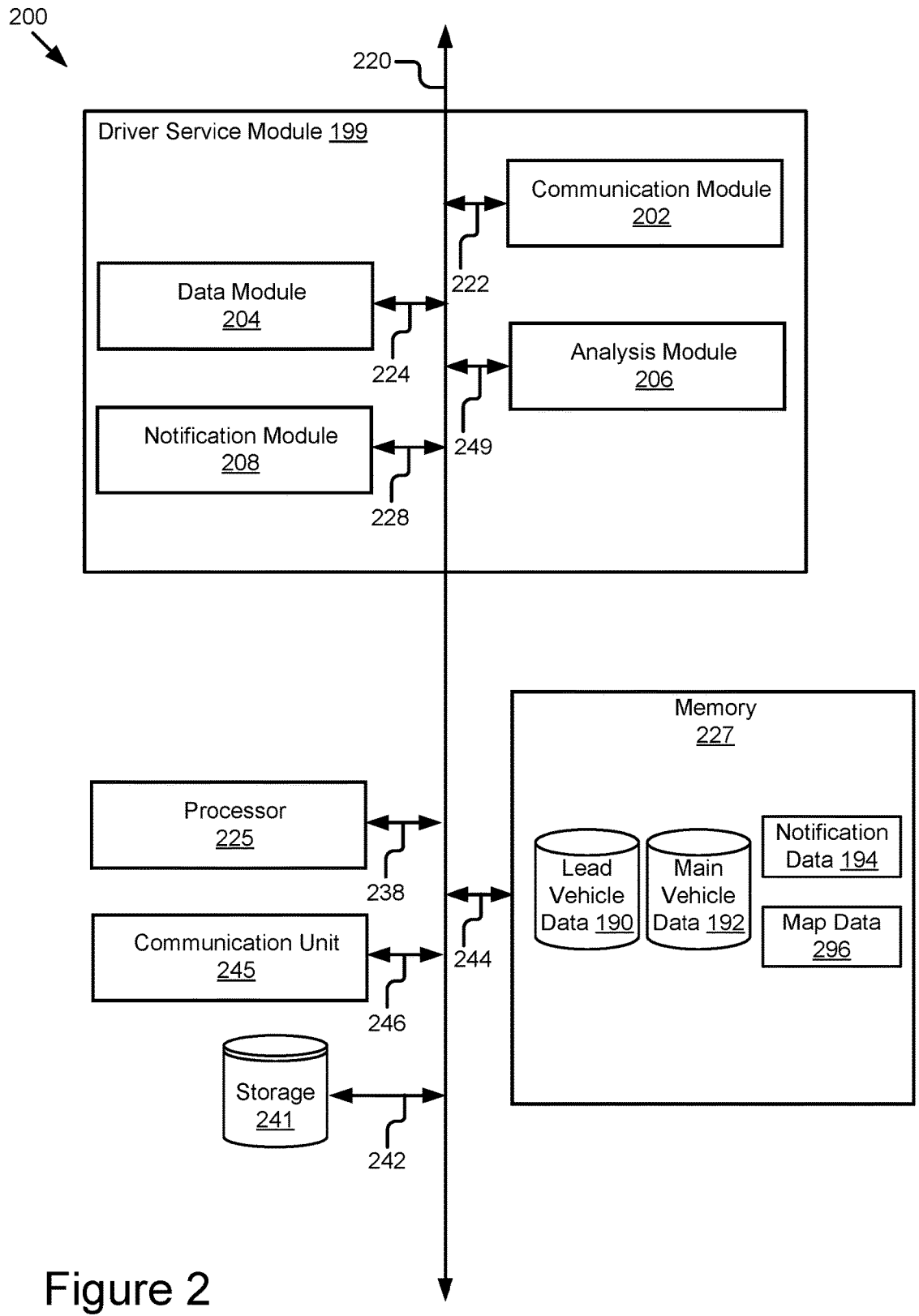
FIG. 2 is a block diagram illustrating an example computer system including a driver service module according to some implementations.

Referring now to FIG. 2, depicted is a block diagram illustrating an example computer system 200 including a driver service module 199 according to some implementations.

In some implementations, the computer system 200 may include a special-purpose computer system that is programmed to perform one or more steps of a method 400 described below with reference to FIG. 4.

In some implementations, the computer system 200 may include a processor-based computing device. For example, the computer system 200 may include the server 102 or the RSU 103.

The computer system 200 may include one or more of the following elements according to some examples: the driver service module 199; a processor 225; a communication unit 245; a storage 241; and a memory 227. The components of the computer system 200 are communicatively coupled by a bus 220.

In the illustrated implementation, the processor 225 is communicatively coupled to the bus 220 via a signal line 238. The communication unit 245 is communicatively coupled to the bus 220 via a signal line 246. The storage 241 is communicatively coupled to the bus 220 via a signal line 242. The memory 227 is communicatively coupled to the bus 220 via a signal line 244.

The processor 225 includes an arithmetic logic unit, a microprocessor, a general purpose controller, or some other processor array to perform computations and provide electronic display signals to a display device. The processor 225 processes data signals and may include various computing architectures including a CISC architecture, a RISC architecture, or an architecture implementing a combination of instruction sets. Although FIG. 2 includes a single processor 225, multiple processors may be included. The processor 225 may include a graphical processing unit. Other processors, operating systems, sensors, displays, and physical configurations may be possible.

The memory 227 stores instructions or data that may be executed by the processor 225. The instructions or data may include code for performing the techniques described herein. The memory 227 may be a DRAM device, a SRAM device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores one or more of the following elements: the lead vehicle data 190; the main vehicle data 192; the notification data 194; and map data 296. These elements were described above with reference to FIGS. 1A-1D, and so, these descriptions will not be repeated here: the lead vehicle data 190; the main vehicle data 192; and the notification data 194.

The map data 296 may include digital data that describes one or more roadways of a geographic area. The map data 296 may include lane-level data that describes the lanes of each roadway. The map data 296 may further include images of business and landmarks. The map data 296 may be used to provide, among other things, lane-level recommendations to a main vehicle that include suggested responses to events. For example, if a first lane is affected by congestion due to at least in part to an event, then a suggested response may include traveling in a second lane that is less affected by the congestion.

Although not depicted in FIG. 2, in some implementations the memory 227 may store an ontology used to classify an event according to one or more types. The memory 227 may further include digital data that describes one or more thresholds (e.g., the occurrence threshold, the timing threshold, etc.)

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 245 includes a port for direct physical connection to the network 105 or to another communication channel. For example, the communication unit 245 includes a USB, SD, CAT-5, or similar port for wired communication with the network 105.

In some implementations, the communication unit 245 includes a wireless transceiver for exchanging data with the network 105 or other communication channels using one or more wireless communication methods, including: IEEE 802.11; IEEE 802.16, Bluetooth, EN ISO 14906:2004 Electronic Fee Collection—Application interface EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

In some implementations, the communication unit 245 includes a DSRC transceiver and a DSRC receiver.

In some implementations, the communication unit 245 includes full-duplex coordination system as described in U.S. patent application Ser. No. 14/471,387 filed on Aug. 28, 2014 and entitled "Full-Duplex Coordination System."

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation shown in FIG. 2, the driver service module 199 includes a communication module 202, a data module 204, an analysis module 206 and a notification module 208. These components of the driver service module 199 are communicatively coupled to each other via the bus 220.

In some implementations, components of the driver service module 199 can be stored in a single server or device. In some other implementations, components of the driver service module 199 can be distributed and stored across multiple servers or devices.

The communication module 202 can be software including routines for handling communications between the driver service module 199 and other components of the computer system 200. In some implementations, the communication module 202 can be a set of instructions executable by the processor 225 to provide the functionality described below for handling communications between the driver service module 199 and other components of the computer system 200. In some implementations, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the computer system 200 or the network 105. For example, the communication module 202 receives, via the communication unit 245, the data included in the lead vehicle data 190 or the data included in the main vehicle data 192. The communication module 202 may send the notification data 194 to the network 105 via the communication unit 245. The main vehicle 123 may receive the notification data 194 from the network 105.

In some implementations, the communication module 202 receives data from components of the driver service module 199 and stores the data in one or more of the storage 241 and the memory 227. For example, the communication module 202 receives the notification data 194 from the notification module 208 and stores the notification data 194 in the memory 227.

In some implementations, the communication module 202 may handle communications between components of the driver service module 199 or the computer system 200. For example, the communication module 202 may retrieve lead vehicle data 190 and main vehicle data 192 and provide this data to the analysis module 206.

The data module 204 can be software including routines for analyzing wireless messages received by the communication unit 245 from the network 105 to parsing environment data 180 or driver data 182 from these wireless messages to build the lead vehicle data 190 and the main vehicle data 192, respectively. Each wireless message may be encoded to include the environment data 180 or the driver data 182.

In some implementations, the data module 204 may also parse out the DSRC-compliant location data associated with each set of environment data 180 and the driver data 182. The data module 204 may associate each set of environment data 180 with the DSRC-compliant location data for the lead vehicle 124 that transmitted that particular set of environment data 180. The data module 204 may associate each set of driver data 182 with each DSRC-compliant location data for the main vehicle 123 that transmitted that particular set of driver data 182.

In some implementations, the data module 204 can be stored in the memory 227 of the computer system 200 and can be accessible and executable by the processor 225. The data module 204 may be adapted for cooperation and communication with the processor 225 and other components of the computer system 200 via signal line 224.

The analysis module 206 can be software including routines for determining whether a particular event described by a set of environment data 180 is relevant to a particular main vehicle 123 based on the driver data 182 and DSRC-compliant location data for that main vehicle 123.

The analysis module 206 may also determine whether a particular event described by a set of environment data 180 is relevant to a particular driver of a main vehicle 123 based on the driver data 182 for the driver of the main vehicle 123. For example, the analysis module 206 may estimate whether the driver is distracted.

In some implementations, the analysis module 206 may provide the ontological analysis described above with reference to FIG. 1B.

In some implementations, the analysis module 206 may also analyze the history data 128 for a main vehicle 123 or a driver of the main vehicle 123 to determine whether the driver is familiar with a particular event.

The analysis module 206 may cause the communication module 202 to transmit a signal to the notification module 208. The signal may indicate one or more of whether the event is relevant to the main vehicle 123 and whether the event is relevant to a driver of the main vehicle. The signal may describe the event type determined via the ontological analysis. In some implementations, the notification module 208 does not provide its functionality until it receives this signal. For example, the notification module 208 does not generate the notification data 194 unless the event is relevant to both the main vehicle and the driver of the main vehicle.

In some implementations, the analysis module 206 can be stored in the memory 227 of the computer system 200 and can be accessible and executable by the processor 225. The analysis module 206 may be adapted for cooperation and communication with the processor 225 and other components of the computer system 200 via signal line 249.

The notification module 208 can be software including routines for generating the notification data 194.

In some implementations, the notification module 208 may encode the notification data 194 to cause a notification system 198 of the main vehicle 123 to describe the event to the driver of the main vehicle (e.g., based on the event type determined by the ontological analysis).

In some implementations, the notification module 208 may encode the notification data 194 to cause a notification system 198 to suggest a recommended response to the event.

In some implementations, the notification module 208 may encode the notification data 194 to include graphical data to cause an electronic panel of the main vehicle 123 to display a warning for the driver of the main vehicle 123. The warning may describe the event or the recommended response to the event.

In some implementations, the notification module 208 may encode a wireless message that includes the notification data 194. The notification module 208 may cause the communication module 202 to provide the wireless message to the communication unit 245. The communication unit 245 may transmit the wireless message to the main vehicle 123 via the network 105.

In some implementations, the notification module 208 can be stored in the memory 227 of the computer system 200 and can be accessible and executable by the processor 225. The notification module 208 may be adapted for cooperation and communication with the processor 225 and other components of the computer system 200 via signal line 228.

Referring now to FIG. 3, depicted is a block diagram illustrating an example computer system 300 including a notification system 198 according to some implementations.

In some implementations, the computer system 300 may include a processor-based computing device. For example, the computer system 300 may include the main vehicle 123 or the lead vehicle 124.

The computer system 300 may include one or more of the following elements according to some examples: the notification system 198; a processor 325; a communication unit 345; DSRC-compliant GPS unit 370; a sensor set 126; a notification device 397; a storage 341; and a memory 327. The components of the computer system 300 are communicatively coupled by a bus 320.

In the illustrated implementation, the processor 325 is communicatively coupled to the bus 320 via a signal line 338. The communication unit 345 is communicatively coupled to the bus 320 via a signal line 346. The DSRC-compliant GPS unit 370 is communicatively coupled to the bus 320 via a signal line 343. The sensor set 126 is communicatively coupled to the bus 320 via a signal line 347. The notification device 397 is communicatively coupled to the bus 320 via a signal line 348. The storage 341 is communicatively coupled to the bus 320 via a signal line 342. The memory 327 is communicatively coupled to the bus 320 via a signal line 344.

The processor 325 includes an arithmetic logic unit, a microprocessor, a general purpose controller, or some other processor array to perform computations and provide electronic display signals to a display device. The processor 325 processes data signals and may include various computing architectures including a CISC architecture, a RISC architecture, or an architecture implementing a combination of instruction sets. Although FIG. 3 includes a single processor 325, multiple processors may be included. The processor 325 may include a graphical processing unit. Other processors, operating systems, sensors, displays, and physical configurations may be possible.

The sensor set 126 and the DSRC-compliant GPS unit 370 were described above with reference to FIGS. 1A and 1B, respectively, and so, these descriptions will not be repeated here.

The notification device 397 includes a device that is operable to provide a warning or forewarning that describe the event for the driver. In some implementations, the notification device 397 may include, for example, an electronic panel of a head-unit or infotainment system that visually displays a warning or forewarning for viewing by the driver. The notification device 397 may include, for example, one or more speakers that provide an auditory description of a warning or forewarning for hearing by the driver.

In some implementations, the notification device 397 may include a three-dimensional heads-up display unit such as the one described in U.S. patent application Ser. No. 15/080, 433 filed on Mar. 24, 2016 and entitled "Wireless Data Sharing Between a Mobile Client Device and a Three-Dimensional Heads-Up Display Unit," the entirety of which is herein incorporated by reference. The three-dimensional heads-up display unit may graphically depict a warning or forewarning for the driver to view.

The memory 327 stores instructions or data that may be executed by the processor 325. The instructions or data may include code for performing the techniques described herein. The memory 327 may be a DRAM device, a SRAM device, flash memory, or some other memory device. In some implementations, the memory 327 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 3, the memory 327 stores one or more of the following elements: the driver data 182 (e.g., if the computer system 300 is a main vehicle 123); the environment data 180 (e.g., if the compute system 300 is a lead vehicle 124); notification data 194 received from the network 105; and DSRC-compliant location data 399 that describes the location of the computer system 300. These elements were described above with reference to FIGS. 1A-1D, and so, these descriptions will not be repeated here: the driver data 182; the environment data 180; and the notification data 194.

If the computer system 300 is a main vehicle 123, the DSRC-compliant location data 399 may describe the location of the main vehicle 123.

If the computer system 300 is a lead vehicle 124, the DSRC-compliant location data 399 may describe the location of the lead vehicle 124.

The communication unit 345 may include hardware that transmits and receives data to and from the network 105. In some implementations, the communication unit 345 includes a port for direct physical connection to the network 105 or to another communication channel. For example, the communication unit 345 includes a USB, SD, CAT-5, or similar port for wired communication with the network 105. In some implementations, the communication unit 345 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 345 includes a port for direct physical connection to the network 105 or to another communication channel. For example, the communication unit 345 includes a USB, SD, CAT-5, or similar port for wired communication with the network 105. In some implementations, the communication unit 345 includes a wireless transceiver for exchanging data with the network 105 or other communication channels using one or more wireless communication methods, including: IEEE 802.11; IEEE 802.16, Bluetooth, EN ISO 14906:2004 Electronic Fee Collection—Application interface EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some implementations, the communication unit 345 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 345 includes a wired port and a wireless transceiver. The communication unit 345 also provides other conventional connections to the network 105 for distribution of files or media objects using standard network protocols including TCP/IP, HTTP, HTTPS, and SMTP, millimeter wave, DSRC, etc.

In some implementations, the communication unit 345 includes a DSRC transceiver and a DSRC receiver.

In some implementations, the communication unit 345 includes full-duplex coordination system as described in U.S. patent application Ser. No. 14/471,387 filed on Aug. 28, 2014 and entitled "Full-Duplex Coordination System."

The storage 341 can be a non-transitory storage medium that stores data for providing the functionality described herein. The storage 341 may be a dynamic random access memory (DRAM) device, a static random access memory (SRAM) device, flash memory, or some other memory devices. In some implementations, the storage 341 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation shown in FIG. 3, the notification system 198 includes a communication module 302, a sensor module 304 and a warning module 306. These components of the notification system 198 are communicatively coupled to each other via the bus 320.

In some implementations, components of the notification system 198 can be stored in a single server or device. In some other implementations, components of the notification system 198 can be distributed and stored across multiple servers or devices.

The communication module 302 can be software including routines for handling communications between the notification system 198 and other components of the computer system 300. In some implementations, the communication module 302 can be a set of instructions executable by the processor 325 to provide the functionality described below for handling communications between the notification system 198 and other components of the computer system 300. In some implementations, the communication module 302 can be stored in the memory 327 of the computer system 300 and can be accessible and executable by the processor 325. The communication module 302 may be adapted for cooperation and communication with the processor 325 and other components of the computer system 300 via signal line 322.

The communication module 302 sends and receives data, via the communication unit 245, to and from one or more elements of the computer system 300 or the network 105. For example, the communication module 302 receives, via the communication unit 245, the notification data 194. The communication module 302 may send the notification data 194 warning module 306.

In some implementations, the communication module 302 receives data from components of the notification system 198 and stores the data in one or more of the storage 341 and the memory 327. For example, the communication module 302 receives the driver data 182 from the sensor module 304 and stores the driver data 182 in the memory 327.

In some implementations, the communication module 302 may handle communications between components of the notification system 198 or the computer system 300. For example, the communication module 302 may retrieve sensor data (not pictured) from the memory 327 and provide the sensor data to the sensor module 304.

The sensor module 304 can be software including routines for analyzing sensor data collected by the sensor set 126 to generate one or more of the driver data 182 (based on internal sensor data) or the environment data 180 (based on external sensor data).

The sensor module 304 may generate a wireless message. The sensor module 304 may encode the wireless message to include one or more of the driver data 182 and the environment data 180. The wireless message may further be encoded to include the DSRC-compliant location data 399. The sensor module 304 may cause the communication module 302 to provide the wireless message to the communication unit 345. The communication unit 345 may transmit the wireless message. For example, the wireless message may be transmitted to the network 105 or an RSU 103 (e.g., via DSRC or full-duplex wireless communication).

In some implementations, the sensor module 304 can be stored in the memory 327 of the computer system 300 and can be accessible and executable by the processor 325. The sensor module 304 may be adapted for cooperation and communication with the processor 325 and other components of the computer system 300 via signal line 324.

The warning module 306 can be software including routines for providing a warning set to a driver using the notification device 397. The warning set may be based on the notification data 194. The warning set may include a forewarning and a warning as described below with reference to FIG. 5.

In some implementations, the warning module 306 may also analyze the history data 128 for a main vehicle 123 or a driver of the main vehicle 123 to determine whether the driver is familiar with a particular event described by the notification data.

In some implementations, the warning module 306 may determine that an event is no longer relevant to a driver. For example, the most current set of driver data 182 may indicate that the driver is not distracted or likely to not observe the event. Responsive to determining that an event is not relevant to a driver, the warning module 306 may not provide a warning set to the driver.

In some implementations, the warning module 306 may determine that an event is no longer relevant to the main vehicle 123. For example, the route of the main vehicle 123 may have changed so that the event is no longer relevant to the main vehicle 123. Responsive to determining that an event is not relevant to the main vehicle 123, the warning module 306 may not provide a warning set to the driver.

In some implementations, the warning module 306 can be stored in the memory 327 of the computer system 300 and can be accessible and executable by the processor 325. The warning module 306 may be adapted for cooperation and communication with the processor 325 and other components of the computer system 300 via signal line 349.

Figure 4:
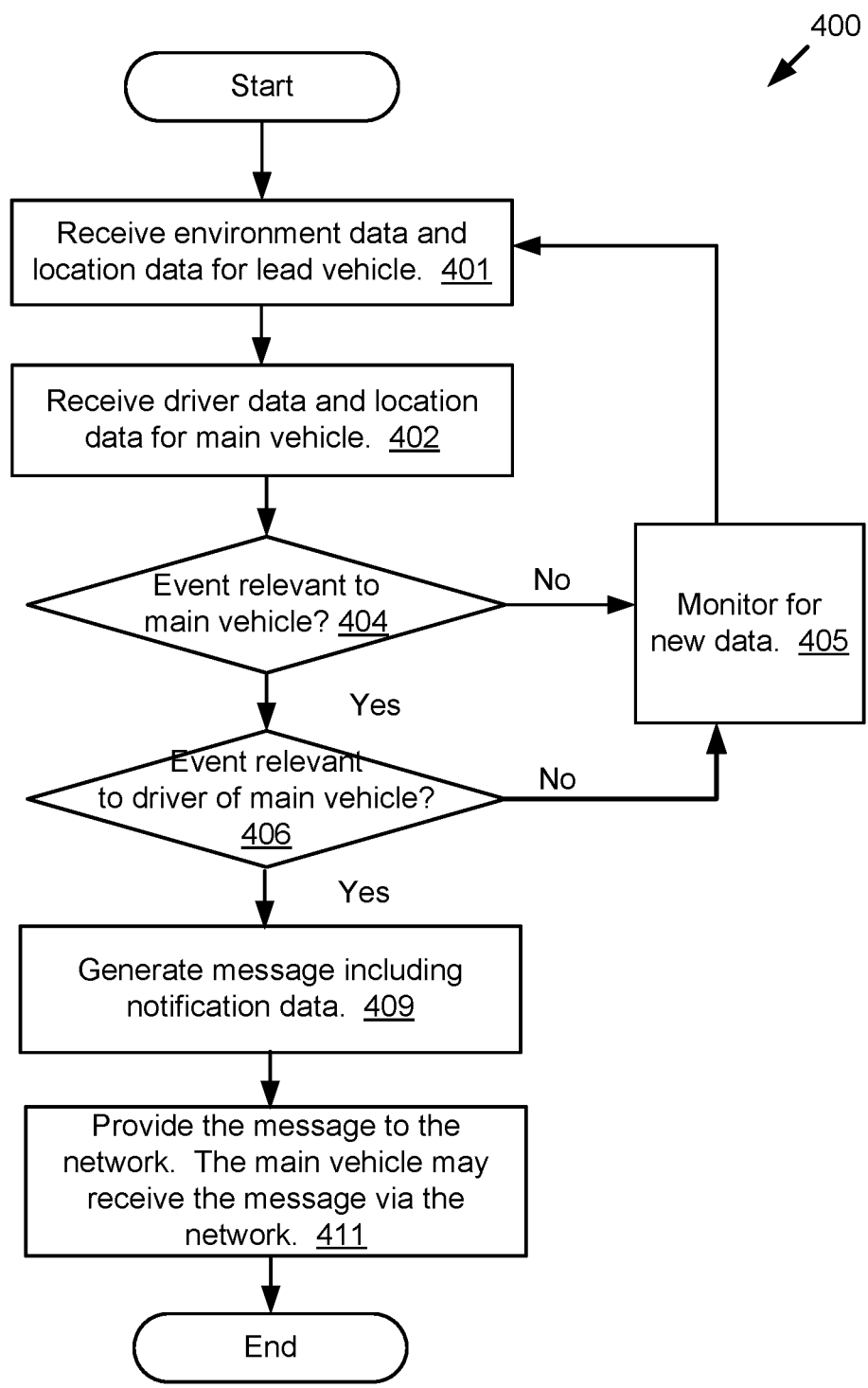
FIG. 4 is a flowchart of an example method for providing situational understanding of one or more unknown roadway conditions that are ahead of a connected vehicle according to some implementations.

Referring now to FIG. 4, depicted is a flowchart of an example method 400 for providing situational understanding of one or more unknown roadway conditions that are ahead of a connected vehicle according to some implementations. One or more of the steps described herein for the method 400 may be executed by one or more of a driver service module 199.

At step 401, environment data and location data for a lead vehicle may be received. The location data may describe the geographic location of the lead vehicle. The location data may be DSRC-compliant.

At step 402, driver data and location data for a main vehicle may be received. The location data may describe the geographic location of the main vehicle. The location data may be DSRC-compliant.

At step 404, a determination is made regarding whether an event described by the environment data is relevant to the main vehicle. If the event is not relevant to the main vehicle, then the method 400 may proceed to step 405. If the event is relevant to the main vehicle, the method 400 may proceed to step 406.

At step 406, a determination is made regarding whether an event is relevant to a driver of the main vehicle. If the event is not relevant to the driver of the main vehicle, then the method 400 may proceed to step 405. If the event is relevant to the driver of the main vehicle, the method 400 may proceed to step 409.

At step 405, the method 400 may include monitoring for new data to be received. If new data is received, the method 400 may proceed to step 401.

At step 409, a message may be generated including notification data.

At step 411, the message may be provided to the network. The main vehicle may receive the message via the network.

Figure 5:
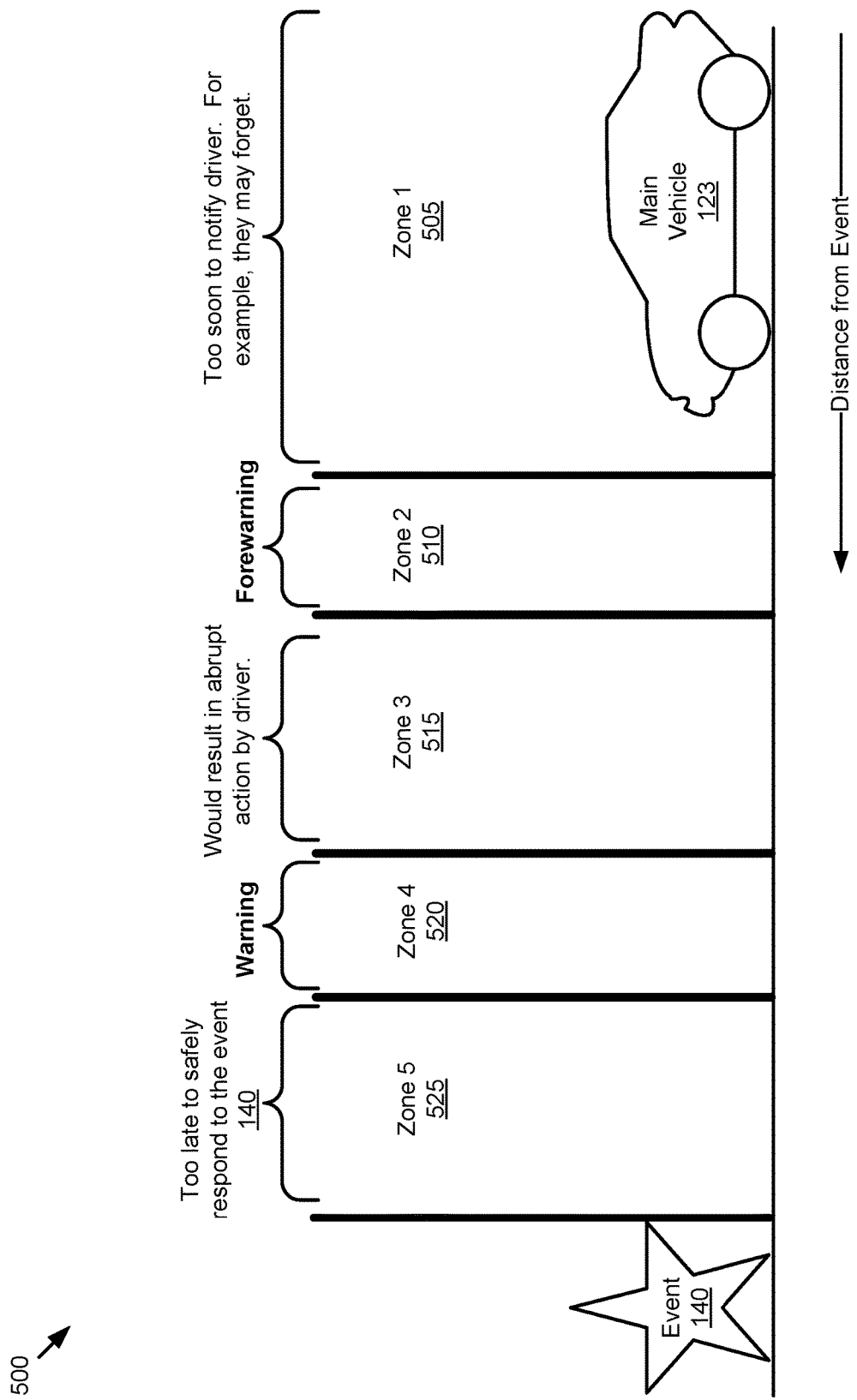
FIG. 5 is a block diagram illustrating a warning set according to some implementations.

Referring now to FIG. 5, depicted is a block diagram illustrating a warning set 500 according to some implementations. The warning set may include (1) the forewarning provided when the main vehicle 123 is geographically present in zone 2 as indicated by element 510 and (2) the warning provided when the main vehicle 123 is geographically present in zone 4 as indicated by element 520.

Element 505 may indicate zone 1. In zone 1, it is too soon to warn the driver since, for example, they may forget about the event 140.

Element 510 may indicate zone 2. In zone 2, a forewarning may be provided to the driver. The forewarning may prepare the driver for the event 140 so that they are not surprised by the event 140 or feel that the warning itself was too abrupt even though the warning was provided in sufficient time for the driver to respond to the event 140. The forewarning may notify the driver that a warning is forthcoming.

Element 515 may indicate zone 3. In zone 3, a warning should not be provided to the driver since it may result in abrupt or dangerous action by the driver.

Element 520 may indicate zone 4. In zone 4, a warning may be provided to the driver. The warning may describe the event. The description may include one or more of the type of event, location of the event, and an estimate of when the event 140 will be viewable to the driver and on what horizon the event 140 will be viewable (driver side window, passenger side window, etc.). The warning may describe a suggestion for responding to the event 140. The warning may cause an ADAS system of the main vehicle 123 to proactively respond to the event 140 with or without input from the driver.

Element 525 may indicate zone 5. In zone 5 it is too late to warn the driver of the event 140. However, the warning may still be provided to the ADAS system of the main vehicle 123 without informing the driver. The ADAS system may take steps to respond to the event.

Some implementations described above may include the driver service module 199 of the server 102 providing analysis about whether a driver of a main vehicle is distracted so that a warning set may be provided to the driver of the main vehicle. However, in some implementations the notification system 198 of the main vehicle may estimate whether the driver of the main vehicle is distracted so that the driver should receive a warning set.

For example, the driver service module 199 of the server 102 may provide event data to the main vehicle via the network 105. The event data may describe an event relevant to the main vehicle. The event may be relevant to the main vehicle because, for example, the event is located on a route of the main vehicle and the main vehicle has not passed the location of the event while traveling the route. The notification system 198 of the main vehicle may receive the event data from the network. The notification system 198 may use the sensor set of the main vehicle to generate driver data describing one or more activities of the driver of the main vehicle. The notification system may estimate whether the driver is distracted based on the driver data. If the driver is estimated to be distracted, the notification system 198 may provide a warning set to the driver that describes the event based on the event data.

Example implementations where the notification system 198 may estimate whether the driver of the main vehicle is distracted so that the driver should receive a warning set are described below with reference to FIGS. 6-9.

Figure 6:
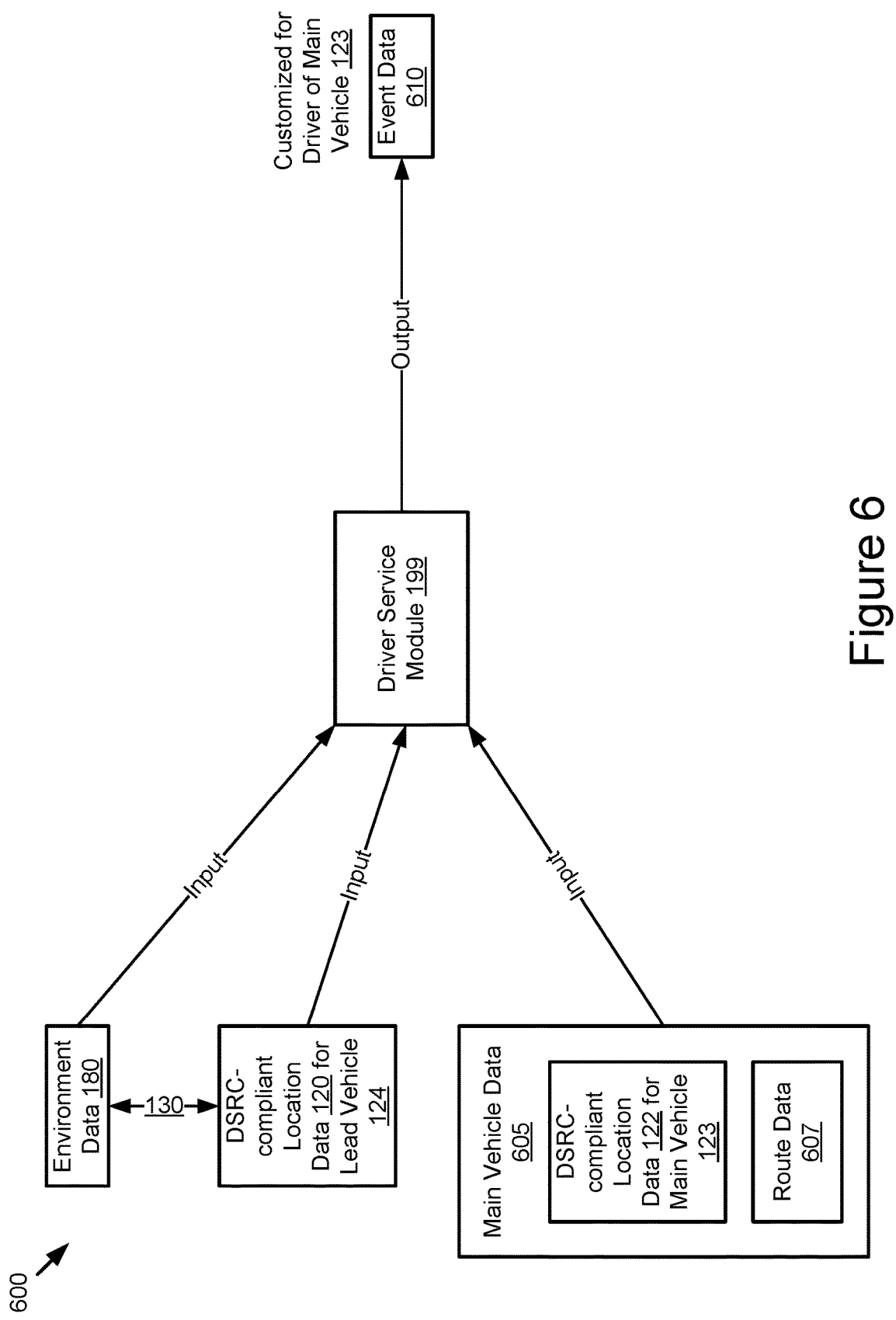
FIG. 6 is a block diagram illustrating a process flow diagram for a driver service module to provide event data according to some implementations.

Referring now to FIG. 6, depicted is a block diagram illustrating a process flow diagram 600 for a driver service module 199 to provide event data 610 according to some implementations.

For example, the driver service module 199 may receive the following data as inputs: the environment data 180; the DSRC-compliant location data 120 for the lead vehicle 124; and main vehicle data 605. The main vehicle data 605 may include the DSRC-compliant location data 122 for the main vehicle 123 and route data 607. The environment data 180, DSRC-compliant location data 120 for the lead vehicle 124 and the DSRC-compliant location data 122 for the main vehicle 123 were described above with reference to FIGS. 1A-5, and so, those descriptions will not be repeated here.

The route data 607 may describe a route for the main vehicle 123. For example, the route may include a present or future navigation route for the main vehicle 123. For example, the main vehicle 123 may include a navigation system that generates a navigation route for the main vehicle 123. The navigation route may include directions for traveling from a first geographic point to a second geographic point. The directions may include the streets and turns that the main vehicle may travel in order to get from the first geographic point to the second geographic point. The route data 607 may describe the navigation route for the main vehicle 123. In some implementations, the route data 607 is an element of the DSRC-compliant location data 122.

The driver service module may output event data 610 responsive to analysis of the inputs. For example, the driver service module 199, when executed by a processor 225 of the server 102, may cause the processor 225 to analyze the DSRC-compliant location data 120 for the lead vehicle 124, DSRC-compliant location data 122 of the main vehicle 123 and the route data 607 to determine whether the event described by the environment data 180 is relevant to the main vehicle 123. For example, the driver service module 199 may determine that the event is relevant because (1) the route described by the route data 607 includes the geographic location of the lead vehicle 124 or the event as described by the DSRC-compliant location data 120 and (2) the geographic location of the main vehicle 123 as described by the DSRC-compliant location data 122 for the main vehicle 123 indicates that the main vehicle 123 has not passed the geographic location of the lead vehicle 124 or the event as described by the DSRC-compliant location data 120 for the lead vehicle 124.

The event data 610 may describe the event described by the environment data 180. The event data 610 may also describe the location of the lead vehicle 124 or the event as described by the DSRC-compliant location data 120 for the lead vehicle 124.

The driver service module 199 may cause the event data 610 to be transmitted to the main vehicle 123. For example, the driver service module 199 may generate a wireless message that includes event data 610. The driver service module 199 may cause the communication unit 245 of the server 102 to transmit the wireless message to the network 105 so that the wireless message is receivable by the main vehicle 123 via the network 105.

Figure 7:
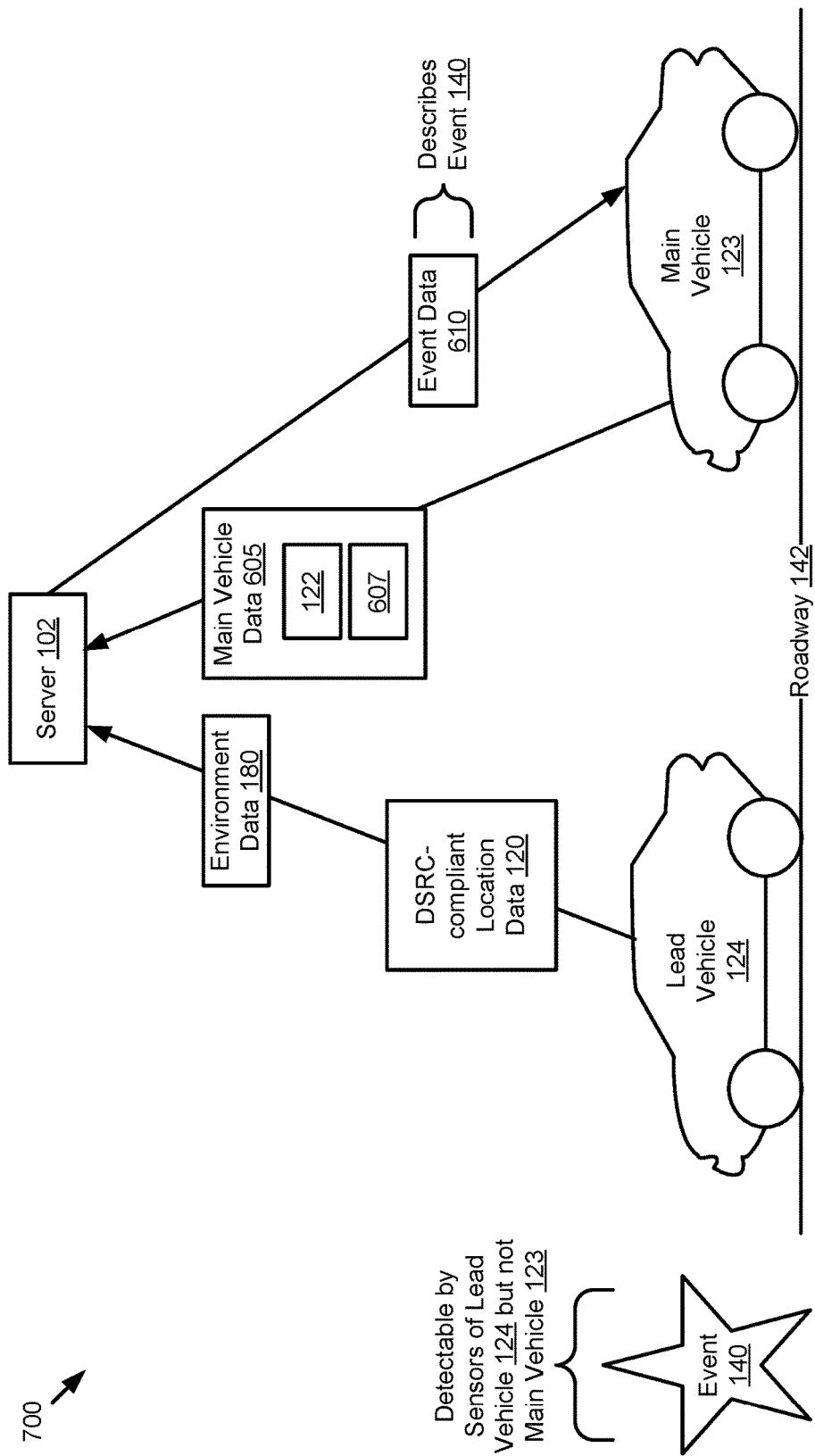
FIG. 7 is a block diagram illustrating a process flow diagram for a system to provide event data to a main vehicle according to some implementations.

Referring now to FIG. 7, depicted is a block diagram illustrating a process flow diagram 700 for a system to provide event data 610 to a main vehicle 123 according to some implementations.

A lead vehicle 124 may detect an event 140 on the roadway 142. The event may be detectable by one or more sensors of the lead vehicle 124 but not detectable by one or more sensors of the main vehicle 123 (or the driver of the main vehicle 123). For example, the event may be outside of sensor range for the sensor set of the main vehicle 123.

The lead vehicle 124 may transmit one or more wireless messages to the server 102. The one or more wireless messages may include environment data 180 that describes the event 140 and DSRC-compliant location data 120 that describes the location of the lead vehicle 124.

A main vehicle 123 may transmit one or more wireless messages to the server 102. The one or more wireless messages may include main vehicle data 606. The main vehicle data 606 may include DSRC-compliant location data 122 that describes the location of the main vehicle 123 and route data 607 that describes a route of the main vehicle 123.

The server 102 may output a wireless message to the main vehicle 123. The wireless message may include event data 610 that describes the event 140. The event data 610 may also describe the geographic location of the lead vehicle 124 or the event 140.

The lead vehicle 124 may optionally provide sensor data (e.g., range finder data describing a distance from the lead vehicle 124 to the event 140) to the server 102 which may be included in the event data 610 to enable the main vehicle 123 to determine the location of the event 140 based on the location of the lead vehicle 124 and the sensor data. The server 102 may include this sensor data in the event data 610. Optionally, the server 102 may determine the location of the event 140 for the main vehicle 123 based on the sensor data and the DSRC-compliant location data 120 and the server 102 may include data describing the location of the event 140 in the event data 610.

Figure 8:
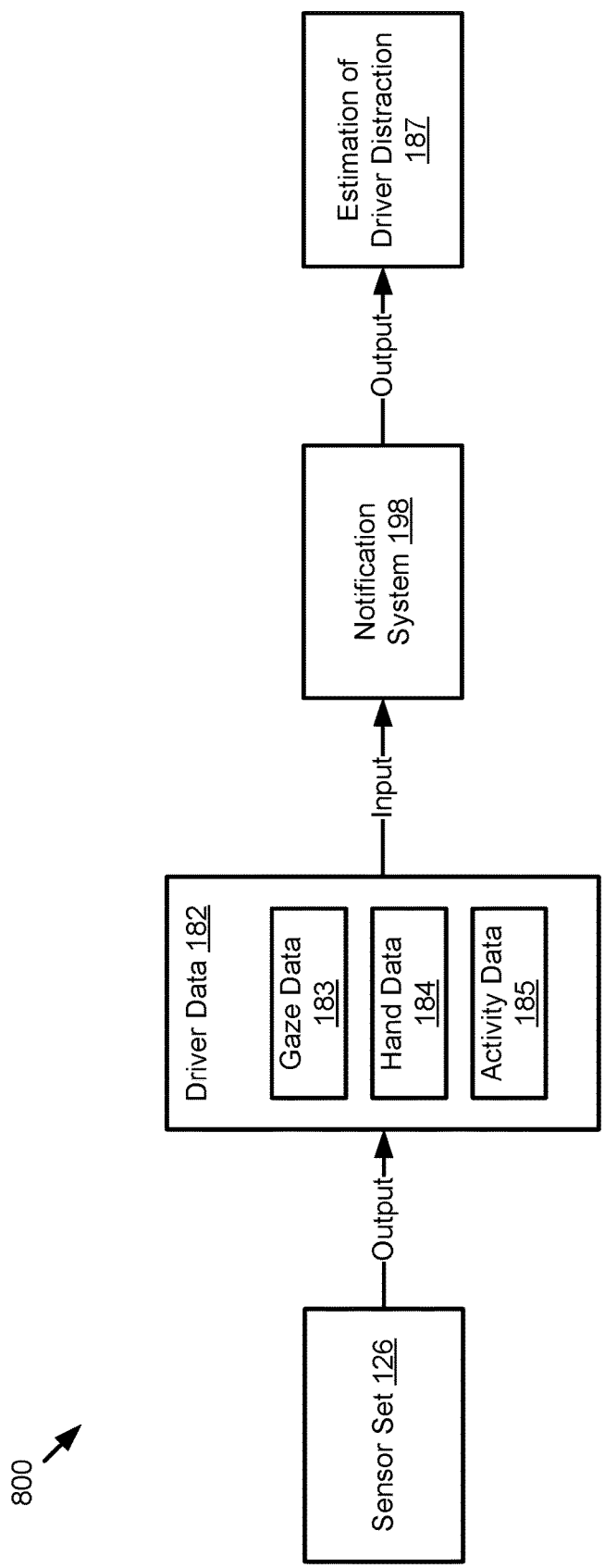
FIG. 8 is a block diagram illustrating a process flow diagram for a notification system to estimate driver distraction according to some implementations.

Referring now to FIG. 8, depicted is a block diagram illustrating a process flow diagram 800 for a notification system 198 to estimate driver distraction according to some implementations.

The sensor set 126 of the main vehicle 123 may output the driver data 182. The driver data 182 may include one or more of the following elements: gaze data 183; hand data 184; and activity data 185. The driver data 182, gaze data 183, hand data 184 and the activity data 185 were described above with reference to FIGS. 1A-5, and so, those descriptions will not be repeated here.

The driver data 182 may be inputted to the notification system 198. The notification system 198 may analyze the driver data 182 in a manner similar to that described above for the driver notification module 199 with reference to FIG. 1C. The notification system 198 may output the estimation of driver distraction 187. The estimation of driver distraction was described above with reference to FIG. 1C, and so, that description will not be repeated here.

The notification system 198 may output confidence factors similar to those described above for FIG. 1C. The notification system 198 may use the confidence factors in a manner similar to the driver service module 199 as described above with reference to FIG. 1C.

Figure 9:
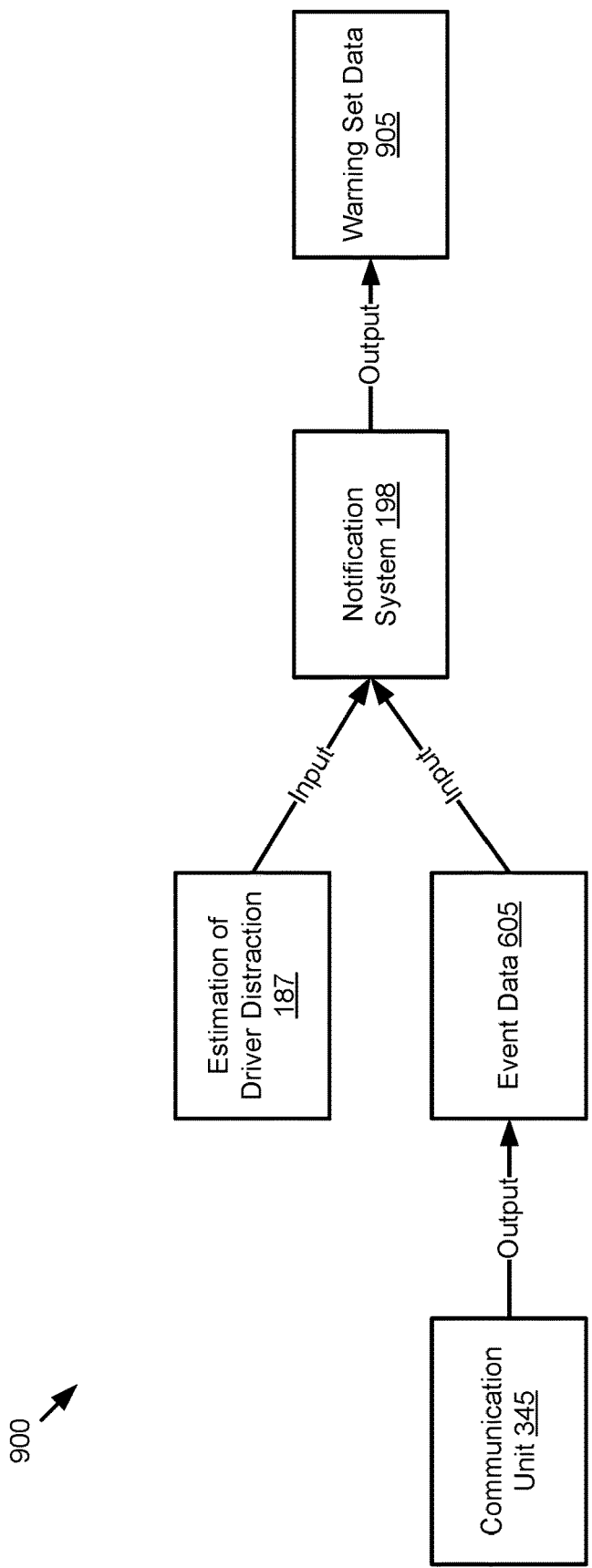
FIG. 9 is a block diagram illustrating a process flow diagram for a notification system to generate notification data according to some implementations.

Referring now to FIG. 9, depicted is a block diagram illustrating a process flow diagram 900 for a notification system 198 to generate notification data 194 according to some implementations.

The communication unit 345 of the main vehicle 123 may receive the event data 605 from the network 105. The communication unit 345 may output the event data 605. The event data 605 was described above with reference to FIG. 6, and so, that description will not be repeated here.

The event data 605 and the estimation of driver distraction 187 may be inputted to the notification system 198. The notification system 199 may analyze the estimation of driver distraction to determine whether the driver of the main vehicle 124 should be provided with a warning set that describes the event described by the event data 605. For example, if the estimation of driver distraction 187 indicates that the driver is distracted, then the notification system 198 may generate warning set data 905 that describes the event which is described by the event data 605.

In some implementations, the warning set data 905 may also describe the location of the event as described by the event data 605.

In some implementations, the warning set data 905 may include graphical data for generating a GUI that includes a warning or forewarning of the event as described above with reference to FIG. 5. The warning set data 905 may include audio data for generating audio that describes the warning or the forewarning as described above with reference to FIG. 5.

In some implementations, the notification system 198 may time the delivery of the warning set to the driver as described above with reference to FIG. 5.

Referring now to FIG. 1A, one or more of the following devices may be a communication device: a main vehicle 123; a lead vehicle 124; a server 102; and an RSU 103. Regarding U.S. patent application Ser. No. 14/471,387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the main vehicle 123, the lead vehicle 124, the RSU 103 or any other communication device may include a full duplex coordination system for implementing full-duplex wireless communications. The full duplex coordination system may include a processor and a memory storing instructions that, when executed, cause the full duplex coordination system to: create, at a first communication device (such as a main vehicle 123, etc.), first data (such as the driver data 182) to transmit to a second communication device (such as a RSU 103, etc.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as any combination of the notification data 194) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 227 or the memory 327) from a first communication device via a wireless channel; determine that a second communication device is a single destination of the first data based on the first portion of the first data; determine that the second communication device has second data (such as any combination of the data stored on the memory 227 or the memory 327) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in a main vehicle 123 and a lead vehicle 124 such as is depicted in FIG. 1A) or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computer system that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system comprising:
a computing device that analyzes environment data associated with a lead vehicle and driver data associated with a main vehicle to determine whether an event associated with the lead vehicle is relevant to the main vehicle, wherein the environment data describes a first geographic location of the event and the driver data describes a second geographic location of the main vehicle and wherein the event is determined to be relevant to the main vehicle because (1) the main vehicle is travelling on a route that includes the first geographic location and (2) the second geographic location indicates that the main vehicle has not passed the first geographic location; and
wherein one or more of the first geographic location and the second geographic location is determined by a Dedicated Short Range Communication (DSRC)-compliant GPS unit that is accurate to within plus or minus 1.5 meters of an actual location of one or more of the lead vehicle and the main vehicle.

2. The system of claim 1, wherein the system further comprises:
the main vehicle including a notification system that is operable to determine that the event is relevant to a driver based on the driver data indicating that the driver is engaged in one or more actions so that the driver is estimated to not be aware of the event and provide a warning set to the driver that describes the event so that the driver is aware of the event.

3. The system of claim 2, wherein the warning set includes a forewarning at a first time and a warning at a second time.

4. The system of claim 3, wherein the first time occurs before the second time.

5. The system of claim 2, wherein the one or more actions of the driver include one or more of an eye gaze of the driver being associated with distraction, a head position of the driver being associated with distraction and a head orientation of the driver being associated with distraction.

6. The system of claim 2, wherein the one or more actions of the driver include one or more hands of the driver being in an area of the main vehicle associated with distraction.

7. The system of claim 2, wherein the one or more actions of the driver include operation of one or more of a head unit or an infotainment system of the main vehicle.

8. The system of claim 2, wherein the notification system does not provide the warning set to the driver if historical data indicates that the driver is aware of the event.

9. The system of claim 2, wherein the warning set does not include a warning when the main vehicle is greater than a first distance from the event, the warning set includes a forewarning when the main vehicle is between the first distance and a second distance from the event, the warning set does not include the warning when the main vehicle is between the second distance and a third distance from the event, and the warning set does include the warning when the main vehicle is less than the third distance from the event.

10. The system of claim 1, wherein a roadside unit receives one or more of the environment data and main vehicle data prior to its receipt by the computing device to form received data including one or more of the environment data and the main vehicle data, wherein the received data is received by the roadside unit via one or more DSRC messages transmitted by one or more of the lead vehicle and the main vehicle, and wherein the roadside unit is communicatively coupled to a network and the roadside unit wirelessly relays the received data to the computing device via the network.

11. The system of claim 1, wherein main vehicle data includes the driver data associated with the main vehicle, wherein a roadside unit receives one or more of the environment data and the main vehicle data prior to its receipt by the computing device to form received data including one or more of the environment data and the main vehicle data, wherein the received data is received by the roadside unit via one or more full-duplex wireless messages transmitted by one or more of the lead vehicle and the main vehicle, and wherein the roadside unit is communicatively coupled to a network and the roadside unit wirelessly relays the received data to the computing device via the network.

12. A method comprising:
analyzing environment data associated with a lead vehicle and driver data associated with a main vehicle to determine whether an event associated with the lead vehicle is relevant to the main vehicle, wherein the environment data describes a first geographic location of the event and the driver data describes a second geographic location of the main vehicle and wherein the event is determined to be relevant to the main vehicle because (1) the main vehicle is travelling on a route that includes the first geographic location and (2) the second geographic location indicates that the main vehicle has not passed the first geographic location;
wherein one or more of the first geographic location and the second geographic location is determined by a Dedicated Short Range Communication (DSRC)-compliant GPS unit that is accurate to within plus or minus 1.5 meters of an actual location of one or more of the lead vehicle and the main vehicle.

13. The method of claim 12, further comprising:
determining, based on the driver data, that a driver is engaged in one or more actions so that the driver is estimated to not be aware of the event;
determining that the event is relevant to the driver; and
providing a warning set to the driver that describes the event so that the driver is aware of the event.

14. The method of claim 13, wherein the warning set includes a forewarning at a first time and a warning at a second time.

15. The method of claim 13, wherein the one or more actions of the driver include one or more of an eye gaze of the driver being associated with distraction, a head position of the driver being associated with distraction and a head orientation of the driver being associated with distraction.

16. The method of claim 13, wherein the one or more actions of the driver include one or more hands of the driver being in an area of the main vehicle associated with distraction.

17. A computer program product comprising a non-transitory memory of a computing device storing computer-executable code that, when executed by a processor, causes the processor to:

analyze environment data associated with a lead vehicle and driver data associated with a main vehicle to determine whether an event associated with the lead vehicle is relevant to the main vehicle, wherein the environment data describes a first geographic location of the event and the driver data describes a second geographic location of the main vehicle and wherein the event is determined to be relevant to the main vehicle because (1) the main vehicle is travelling on a route that includes the first geographic location and (2) the second geographic location indicates that the main vehicle has not passed the first geographic location;

wherein one or more of the first geographic location and the second geographic location is determined by a Dedicated Short Range Communication (DSRC)-compliant GPS unit that is accurate to within plus or minus 1.5 meters of an actual location of one or more of the lead vehicle and the main vehicle.

18. The computer program product of claim 17, wherein the computer-executable code, when executed by the processor, further causes the processor to:

determine, based on the driver data, that a driver is engaged in one or more actions so that the driver is estimated to not be aware of the event;

determine that the event is relevant to the driver; and provide a warning set to the driver that describes the event so that the driver is aware of the event.

19. The computer program product of claim 18, wherein the warning set includes a forewarning at a first time and a warning at a second time.

20. The computer program product of claim 18, wherein the one or more actions of the driver include one or more of an eye gaze of the driver being associated with distraction, a head position of the driver being associated with distraction and a head orientation of the driver being associated with distraction.

* * * * *